(12) United States Patent
Wang et al.

(10) Patent No.: US 12,664,415 B2
(45) Date of Patent: Jun. 23, 2026

(54) ANALOG HARDWARE IMPLEMENTATION OF ACTIVATION FUNCTIONS

(71) Applicant: Intel Corporation, Santa Clara, CA (US)

(72) Inventors: Hechen Wang, Portland, OR (US); Niranjan Mylarappa Gowda, Hillsboro, OR (US); Andrey Belogolovy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 17/578,324

(22) Filed: Jan. 18, 2022

(65) Prior Publication Data

US 2022/0138548 A1 May 5, 2022

(51) Int. Cl.
  *G06N 3/065* (2023.01)
  *G06N 3/0464* (2023.01)
  *G06N 3/048* (2023.01)
(52) U.S. Cl.
  CPC ........... *G06N 3/065* (2023.01); *G06N 3/0464* (2023.01); *G06N 3/048* (2023.01)
(58) Field of Classification Search
  CPC ....... G06N 3/0464; G06N 3/048; G06N 3/065
  See application file for complete search history.

(56) References Cited

U.S. PATENT DOCUMENTS

| | | | |
|---|---|---|---|
| 2020/0143255 A1 | 5/2020 | Daniel et al. | |
| 2020/0176493 A1* | 6/2020 | Ikeda ..................... | H04N 25/46 |
| 2020/0311535 A1 | 10/2020 | Shrivastava | |
| 2021/0406662 A1* | 12/2021 | Timofejevs ............. | G06F 30/39 |
| 2022/0138548 A1 | 5/2022 | Wang et al. | |
| 2023/0082313 A1* | 3/2023 | Aoki ..................... | G11C 11/405 |
| | | | 708/190 |

OTHER PUBLICATIONS

M. Carrasco-Robles and L. Serrano, "A Novel Minimum-Size Activation Function and Its Derivative," in IEEE Transactions on Circuits and Systems II: Express Briefs, vol. 56, No. 4, pp. 280-284, Apr. 2009 (Year: 2009).*

(Continued)

*Primary Examiner* — Emily E Larocque
*Assistant Examiner* — Jerome Anthony Klosterman, II
(74) *Attorney, Agent, or Firm* — Akona IP PC

(57) ABSTRACT

An analog neural network including a hardware activation function is provided. A layer of the analog neural network includes a sequence of processing elements that receives analog signals, perform MAC operations on the analog signals, and generates analog outputs. The analog outputs are provided to an analog circuitry that can apply an activation function on the analog outputs. The output of the analog circuitry are also analog signals, which can further be provided to the next layer in the network. The analog circuitry may include a differential pair of transistors to compute the tanh activation function. Alternatively, the analog circuitry may include a comparator and multiplexer to compute the ReLU activation function. Compared with digital implementation of activation functions, the analog circuitry eliminates the need of converting the analog outputs of the layer to digital signals and the need of converting the result of the activation function to analog signals.

25 Claims, 16 Drawing Sheets

400

(56) References Cited

OTHER PUBLICATIONS

"Imec and Globalfoundries Announce Breakthrough in AI Chip, Bringing Deep Neural Network Calculations to IoT Edge Devices," Press Release, Jul. 8, 2020; 2 pgs.

Gong, N., et al., "Signal and noise extraction from analog memory elements for neuromorphic computing," Nature communications 2018: 9-2102; 8 pages.

Hemsoth, Nicole, "A Mythic Approach to Deep Learning Inference," The Next Platform, Aug. 23, 2018; 8 pages.

Khaddam-Aljameh, Riduan, et al., "An SRAM-Based Multibit In-Memory Matrix-Vector Multiplier With a Precision That Scales Linearly in Area, Time, and Power," IEEE Transactions on Very Large Scale Integration (VLSI) Systems, vol. 29, No. 2, Feb. 2021; 14 pages.

Noack, Marko, "Switched-capacitor realization of presynaptic short-term-plasticity and stop-learning synapses in 28nm CMOS," Frontiers in Neuroscience, Feb. 2, 2015; 14 pages.

Nvidia Corporation, "Nvidia AI for GPU-Accelerated Deep Learning Inference," Technical Overview, Sep. 2021; 22 pages.

Nvidia, "Nvidia T4 70W Low Profile PCI3 GPU Accelerator," Product Brief, NVIDIA Corporation, Apr. 2020; 13 pages.

Nvidia, "Nvidia T4 Tensor Core GPU," Tensor Core Datasheet, NVIDIA Corporation, Mar. 2019; 2 pages.

Nvidia, "Nvidia T4 Tensor Core GPUs for Accelerating Inference: Next-Level Acceleration Has Arrived," Nvidia Corporation; 2 pages.

Nvidia, "Nvidia Turing Architecture: Graphics Reinvented," Whitepaper, Nvidia Corporation, 2018; 86 pages.

Nvidia, "State of the Art AI: GPU Deep Learning with the Nvidia TensorRT Hyperscale Inference Platform," TensorRT Inference Infographic, Nvidia Corporation 2018; 1 page.

Sebastian, Abu, et al., "Memory devices and applications for in-memorycomputing," Nature Nanotechnology, Vo. 15, Jul. 2020; 16 pages.

Wikipedia, "Tensor Processing Unit," edited Nov. 24, 2021; 7 pages.

Yan, Bonan, et al., "Resistive Memory-Based In-Memory Computing: FromDevice and Large-Scale Integration System Perspectives," Advanced Intelligent Systems 2019; 16 pages.

Zhang, Jin, et al., "An 8T SRAM Array with Configurable Word Lines for In-Memory Computing Operation," published Jan. 27, 2021, Electronics 2021; 13 pages.

Zhang, Jintao, et al., "An In-memory-Computing DNN Achieving 700 TOPS/W and 6 TOPS/mm-2 in 130-nm CMOS," IEEE Journal on Emerging and Selected Topics in Circuits and Systems, vol. 9, No. 2, Jun. 2019; 9 pages.

Kenzhina et al., "Analysis of Hyperbolic Tangent Passive Resistive Neuron With CMOS-Memristor Circuit", 978-1-5386-5928-1 (c) 2018 IEEE, 5 pages.

Shakiba et al., "Novel Analog Implementation of a Hyperbolic Tangent Neuron in Artificial Neural Networks", IEEE Transactions on Industrial Electronics, vol. 68, No. 11, Nov. 2021, 12 pages.

Al-Ruwaihi, CMOS Analogue Neurone Circuit with Programmable Activation Functions Utilising MOS Transistors with Optimised Process/Device Parameters, IEEE Proceedings, Circuit Devices and Systems, Institution of Electrical Engineers, Stenvenage, GB, vol. 144, No. 6, Dec. 1, 1997, 5 pages.

Liang-Hung Lu et al., The Design of the CMOS Current-Mode General Purpose Analog Processor, Circuits and Systems, 1994, ISCAS '94, 1994 IEEE International Symposium on London, UK May 30-Jun. 2, 1994, vol. 5, May 30, 1994, 4 pages.

* cited by examiner

1200

1300

MUX 1320    V$_{OUT,P}$

MUX 1330    V$_{OUT,N}$

V$_{DD}$/2

V$_{IN,P}$
V$_{IN,N}$ clk

Comparator 1310

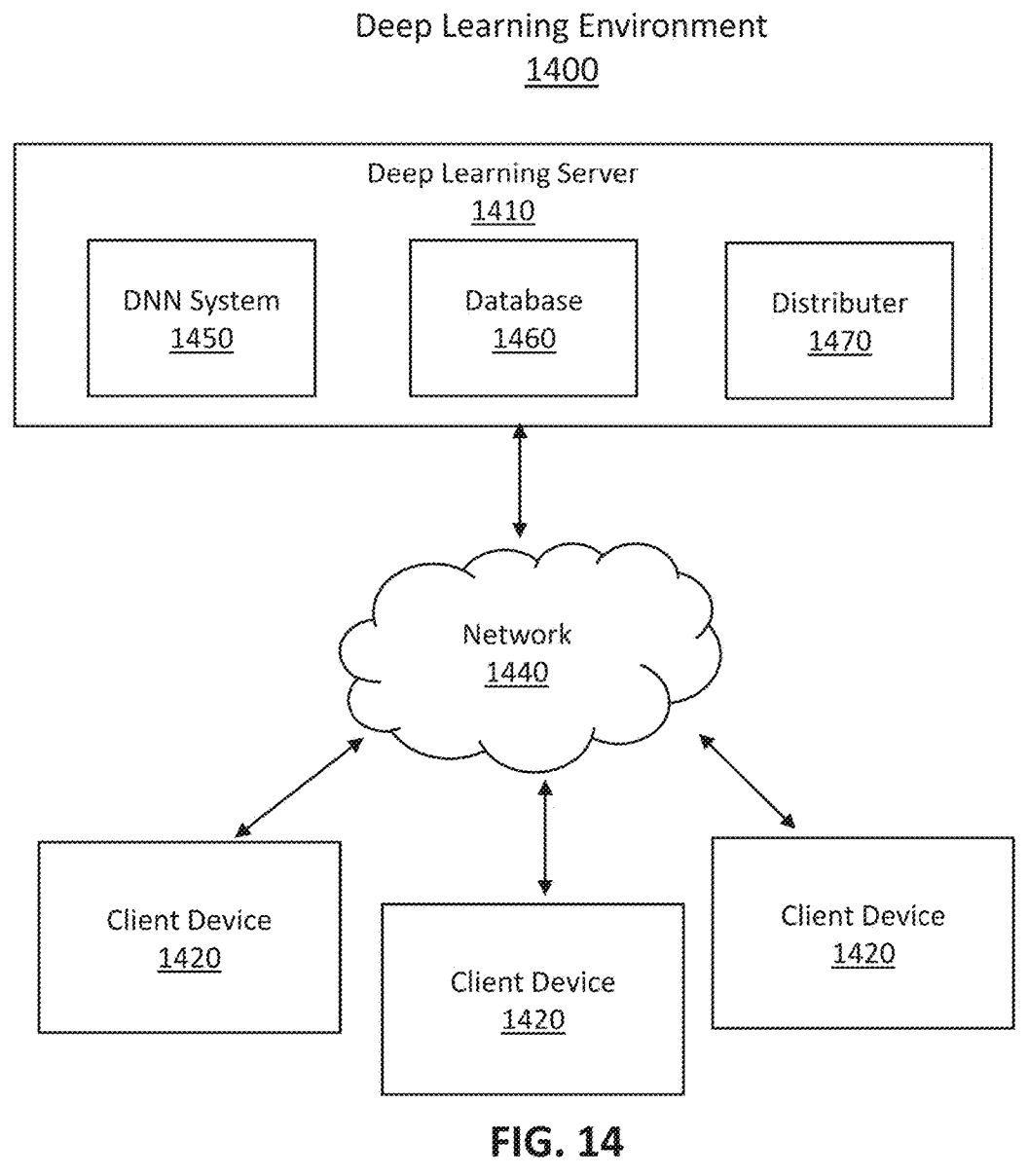

Deep Learning Environment
1400

Deep Learning Server
1410

DNN System
1450

Database
1460

Distributer
1470

Network
1440

Client Device
1420

Client Device
1420

Client Device
1420

FIG. 14

ANALOG HARDWARE IMPLEMENTATION OF ACTIVATION FUNCTIONS

TECHNICAL FIELD

This disclosure relates generally to neural networks, and more specifically, to analog hardware implementation of activation functions.

BACKGROUND

Deep neural networks (DNNs) have been used extensively for a variety of artificial intelligence applications ranging from computer vision to speech recognition and natural language processing. DNNs typically include activation functions. An activation function in an DNN defines how the weighted sum of the input is transformed into an output from a node or nodes in a layer of the network. Activation functions play a vital role in the capability and performance of DNNs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 14 illustrates a deep learning environment, in accordance with various embodiments.

DETAILED DESCRIPTION

Overview

Figure 1:
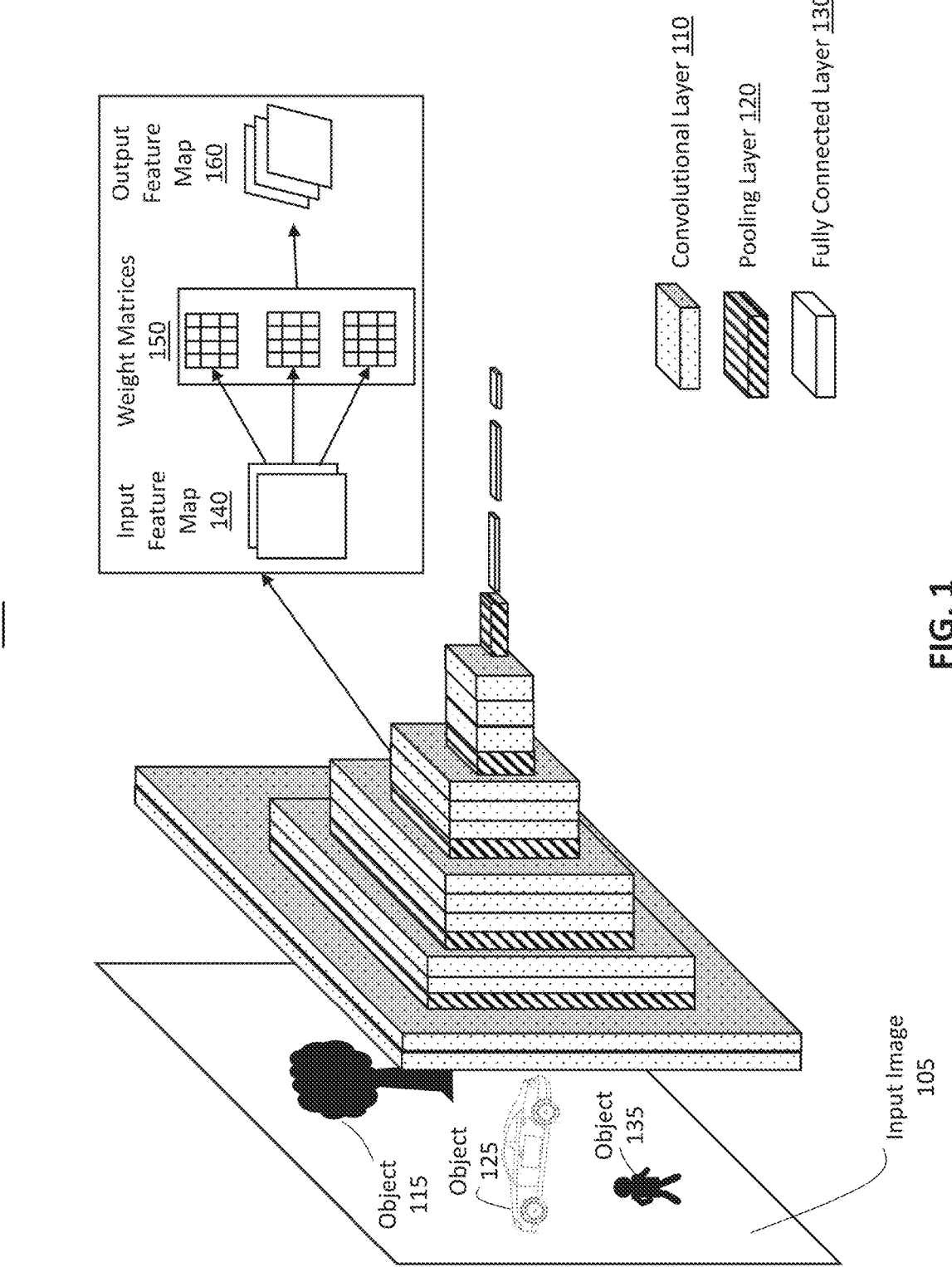
FIG. 1 illustrates an architecture of an example DNN, in accordance with various embodiments.

Deep learning (DL) models are characterized by the ability to produce effective representations of data using automatic latent feature extraction. To accomplish this, DNNs are substantially more complex compared to more traditional machine learning techniques and require many orders of magnitude more parameters to be trained. Analog compute in-memory (ACiM) is a promising scheme to realize high efficiency DNNs. Analog in-memory computing generally refers to using analog circuitry within the DNN of an otherwise digital machine learning processor in order to perform the multiply-accumulate (MAC) functions. The ACiM scheme includes an array of MAC calculation hardware, which can execute a large amount of MAC operations simultaneously. The MAC operation unit in the analog domain can be just a tunable resistor, an adjustable delay cell, or several switching capacitors. Such MAC operation unit is much simpler than digital arithmetic units. Thus, the ACiM brings overwhelming advantages over the conventional schemes, e.g., in terms of power and area efficiency.

However, there is an issue that could neutralize the advantages of the ACiM when implementing DNN applications. In a typical DNN, each neuron performs two basic mathematical operations: sum-weighted input feature using MAC unit, and non-linear activation function over computed sum. The ACiM scheme provides an energy efficient way to compute MAC operations in analog domain, while the activation function is still computed in digital domain. Although the number of operations related to those activation functions is just a fragment of the total DNN computations, they are discretely segmented in each layer of the network. As a result, the data needs to be converted between the digital and analog domains over and over again. Sometimes, more than 50% energy can be consumed by data converters. This can neutralize some, if not all, of the benefits gained by the ACiM when implementing DNN applications.

A solution to this problem is converting the computed analog signal to digital data by data converters and leveraging digital circuits to perform those activation functions. Massive and recurrent data conversion across analog and digital domains has become a bottleneck of the ACiM. To pursue multibit ACiM solutions for better neural network accuracy, analog-digital converters (ADCs) and digital-analog converts (DACs) need to meet various requirements. First, they need to support at least 8-bit dynamic range, which is the mainstream requirement in fixed-point neural network applications to achieve tolerable accuracy loss when compared with floating-point benchmarks. Second, a certain speed (normally several hundred MS/s (mega sample per second) or more) is required to support the data throughput of the ACiM. Otherwise, it will become the major bottleneck in the data flow. Third, high linearity (less than 2 LSB (least significant bit) in both INL (integral non-linearity) and DNL (differential non-linearity)) needs to be guaranteed to ensure the converter can have sufficient effective number of bits. Fourth, the power and area consumptions are tightly restricted, as there will be hundreds, or thousands of data converters placed on the chip. As a result, each ADC or DAC can only operate with a power consumption in uW level. It is very difficult, if not impossible to meet such requirements.

Another problem is related to the digital implementation of activation functions. There are a variety of activation functions available. Among them, ReLU and tanh are two of the most adopted activation functions in DNNs. ReLU is often used in hidden layers, while tanh is often tied to fully connected layers. The ReLU activation function is a non-linear piecewise function that will output the input directly if it is positive, otherwise, it will give zero. ReLU's hardware implementation is very simple with digital circuits. A MUX can serve the purpose. The select bit of the MUX can be controlled by the sign bit of the input data. If the sign bit is zero, meaning positive, the input will be connected to the output. If the sign bit is one, meaning negative, then the output will be masked by zero.

Things become more complicated when comes to the tanh activation function. There are two most adapted digital implementation solutions: Coordinate Rotation Digital Computing (CORDIC) and LookUp Table (LUT). CORDIC algorithm is the way to compute the value of tan h accurately. Although the CORDIC has already been considered as one of the most simple and efficient algorithms to compute tanh function, its hardware realization still needs at least 3,000 logic gates or 18,000 transistors. Its power consumption at 200 MHz is normally above 10 mW, which is unacceptably high for large parallel processing. The second solution to realize tanh is LUT, which is an array that replaces runtime computation with a simpler array indexing operation. The savings in power consumption and processing time can be significant, because retrieving a value from memory is often faster and energy efficient than carrying out an actual computation. However, the consequence is worse accuracy, as the content stored in the array has a limit, and the input to output is not a one-to-one mapping normally. Therefore, improved technologies for computing activation functions in analog neural networks are needed.

Embodiments of the present invention relate to analog circuits that compute activation functions, such as ReLU and tanh activation functions. An example analog circuit includes a differential pair of transistors for calculating tanh activation functions. The differential pair may include two transistors, such as two BJT or two MOSFETs. The analog circuit may include one input terminal to compute tanh activation functions with single-ended signals, or include two input terminals to tanh activation functions with differential signals. In some embodiments, the differential pair includes two group of the transistors. Each group includes multiple transistors that are arranged in parallel. The differential pair can have a common centroid layout where the centroid of the first group coincides with the centroid of the second group. The transistors in the differential pair have same characteristics, such as same size, etc. The transistors, in some embodiments, may be identical.

Another example analog circuit includes an analog comparator and an analog MUX for calculating ReLU activation functions. In some embodiments, the analog circuit includes one analog MUX to compute tanh activation functions with single-ended signals. In other embodiments, the analog circuit includes two analog MUXs to compute tanh activation functions with differential signals.

The present invention provides practical and efficient solutions to realize the two mostly used activation functions, ReLU and tan h, with analog circuitry. Input signals of the analog circuits can be outputs from a layer of an analog neural network, e.g., a layer including an array of analog in-memory computing devices. The analog circuits compute activation functions with the input signals and generate output signals. The output signals are analog output signals and can be used as input to the next layer in the network. Analog neural networks using the analog circuits can process data in the analog domain and do not require data converters to convert analog signals and digital signals back and forth. Furthermore, the analog implementations of activation functions can be simpler than digital implementations of activation functions. For instance, the analog circuits for calculating tanh activation functions need a small number of transistors, e.g., less than 10, which is much simpler than the digital implementation of tanh activation functions. Thus, the analog implementation of activation functions not only can reduce hardware requirements of analog neural networks but can also improve energy and space efficiency.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

In addition, the terms "comprise," "comprising," "include," "including," "have," "having" or any other variation thereof, are intended to cover a non-exclusive inclusion. For example, a method, process, device, or sparsity balancing system that comprises a list of elements is not necessarily limited to only those elements but may include other elements not expressly listed or inherent to such method, process, device, or sparsity balancing system. Also, the term "or" refers to an inclusive "or" and not to an exclusive "or."

The sparsity balancing systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN Architecture

FIG. 1 illustrates an architecture of an example DNN 100, in accordance with various embodiments. For purpose of illustration, the DNN 100 in FIG. 1 is a Visual Geometry Group (VGG)-based convolutional neural network (CNN). In other embodiments, the DNN 100 may be other types of DNNs. The DNN 100 is trained to receive images and output classifications of objects in the images. In the embodiment of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers.

The convolutional layers 110 summarize the presence of features in the input image 105. The convolutional layers 110 function as feature extractors. The first layer of the DNN 100 is a convolutional layer 110. In an example, a convolutional layer 110 performs a convolution to an IFM (input feature map) 140 by using weight matrices 150, generates an OFM (output feature map) 160 from the convolution, and passes the OFM 160 to the next layer in the sequence. The IFM 140 may include a plurality of IFM matrices. The OFM 160 may include a plurality of OFM matrices. For the first convolutional layer 110, which is also the first layer of the DNN 100, the IFM 140 is the input image 105. For the other convolutional layers, the IFM 140 may be an output of another convolutional layer 110 or an output of a pooling layer 120. The convolution is a linear operation that involves the multiplication of the weight matrices 150 with the IFM 140. A filter may be a 2-dimensional array of weights. Weights of the filters can be initialized and updated by backpropagation using gradient descent. The magnitudes of the weights of the filters can indicate importance of the weight matrices 150 in extracting features from the IFM 140. A filter can be smaller than the IFM 140.

The multiplication applied between a filter-sized patch of the IFM 140 and a filter may be a dot product. A dot product is the element-wise multiplication between the filter-sized patch of the IFM 140 and the corresponding filter, which is then summed, always resulting in a single value. Because it results in a single value, the operation is often referred to as the "scalar product." Using a filter smaller than the IFM 140 is intentional as it allows the same filter (set of weights) to be multiplied by the IFM 140 multiple times at different points on the IFM 140. Specifically, the filter is applied systematically to each overlapping part or filter-sized patch of the IFM 140, left to right, top to bottom. The result from multiplying the filter with the IFM 140 one time is a single value. As the filter is applied multiple times to the IFM 140, the multiplication result is a two-dimensional array of output values that represent a filtering of the IFM 140. As such, the 2-dimensional output array from this operation is referred to as a "feature map."

In some embodiments, the OFM 160 is passed through an activation function. Example activation functions include ReLU or tan h. The convolutional layer 110 may receive several images as input and computes the convolution of each of them with each of the filters. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 performs a convolution on the OFM 160 with new filters and generates a new feature map. The new feature map may also be normalized and resized. The new feature map can be filtered again by a further subsequent convolutional layer 110, and so on.

In some embodiments, a convolutional layer 110 has four hyperparameters: the number of filters, the size F filters (e.g., a filter is of dimensions F×F×D pixels), the S step with which the window corresponding to the filter is dragged on the image (e.g., a step of 1 means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depth-wise separable convolution, transposed convolution, and so on. The DNN 100 includes 16 convolutional layers 110. In other embodiments, the DNN 100 may include a different number of convolutional layers.

The pooling layers 120 downsample feature maps generated by the convolutional layers, e.g., by summarizing the presents of features in the patches of the feature maps. A pooling layer 120 is placed between two convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receives an input vector. The input vector defines the output of the convolutional layers 110 and pooling layers 120 and includes the values of the last feature map generated by the last pooling layer 120 in the sequence. The fully connected layers 130 applies a linear combination and an activation function to the input vector and generates an output vector. The output vector may contain as many elements as there are classes: element i represents the probability that the image belongs to class i. Each element is therefore between 0 and 1, and the sum of all is worth 1. These probabilities are computed by the last fully connected layer 130 by using a logistic function (binary classification) or a softmax function (multi-class classification) as an activation function.

In some embodiments, the fully connected layers 130 classify the input image 105 and returns a vector of size N, where N is the number of classes in the image classification problem. In the embodiment of FIG. 1, N equals 3, as there are three objects 115, 125, and 135 in the input image. Each element of the vector indicates the probability for the input image 105 to belong to a class. To compute the probabilities, the fully connected layers 130 multiply each input element by weight, makes the sum, and then applies an activation function (e.g., logistic if N=2, softmax if N>2). This is equivalent to multiplying the input vector by the matrix containing the weights. In an example, the output vector includes three probabilities: a first probability indicating the object 115 being a tree, a second probability indicating the object 125 being a car, and a third probability indicating the object 135 being a person. In other embodiments where the input image 105 includes different objects or a different number of objects, the output vector can be different.

In some embodiments, the DNN 100 is an analog neural network that operates in the analog domain. For instance, the DNN 100 is implemented with analog devices. A convolutional layer 110 can include a plurality of analog in-memory computing devices to perform MAC operations on analog input signals. The output of the convolutional layer 110 is analog signals. The output of the convolutional layer 110 can be provided to an analog circuit that computes an activation function on the output. The result of computing the activation function, which is also analog signals, can be provided to the next layer in the DNN 100 for further computation. More details regarding DNN layers are provided below in conjunction with FIG. 2. More details regarding analog circuits for computing activation functions are provided below in conjunction with FIG. 4-13.

Example Hardware Architecture of Analog Neural Network

Figure 2:
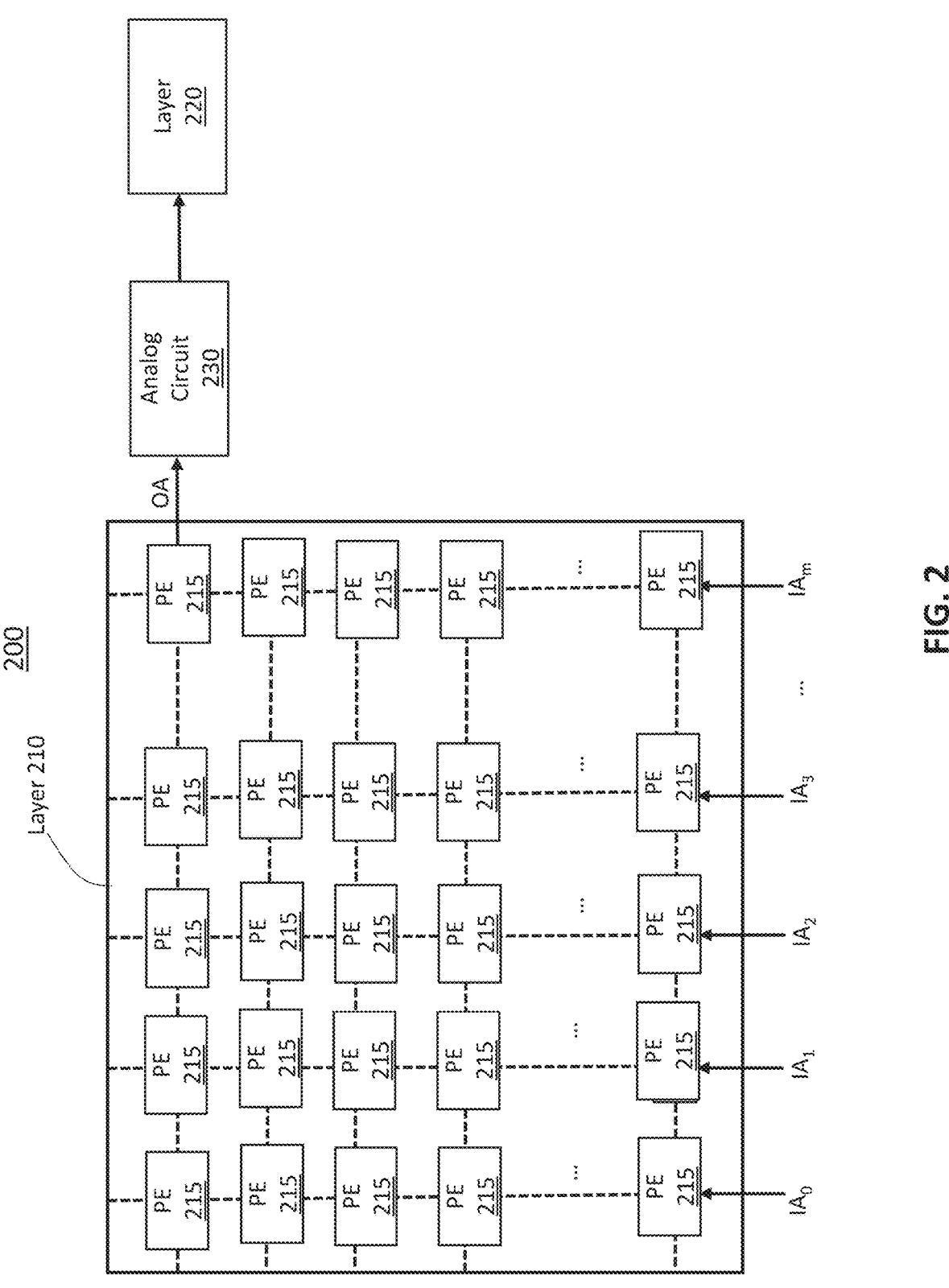
FIG. 2 illustrates a hardware architecture for a layer of a DNN, in accordance with various embodiments.

FIG. 2 illustrates an example hardware architecture 200 for a portion of an analog neural network, in accordance with various embodiments. The analog neural network may be the DNN 100 in FIG. 1. The hardware architecture 200 includes layers 210 and 220 and an analog circuit 230 between the layers 210 and 220. The layer 210 may be a convolutional layer (e.g., the convolutional layer 110 in FIG. 1), a pooling layer (e.g., the pooling layer 120 in FIG. 1), or a fully connected layer (e.g., the fully connected layer 130 in FIG. 1). The analog neural network may include other layers or other analog circuits that are not shown in FIG. 2.

The layer 210 has an input activation (IA), weights, and an output activation (OA). The input activation (IA) may be an input to the analog neural network, an output of a previous layer in the analog neural network, or an output of an activation function. The values of the weights are determined during the process of training the analog neural network. In the embodiment of FIG. 2, the layer 210 includes a plurality of processing elements (PEs) 215 (individually referred to as "PE 215") that are arranged in columns and rows. The input and weights of the layer 210 may be distributed to the PEs 215 based on the columns. A column of PEs 215 receives a portion of the input (IA) and a portion of weights and perform MAC operations. The relationship between the input activation (IA) and the output activation (OA) of the layer 210 can be defined by the following equation:

$$OA = \sum_{i=0}^{m} W_i \times IA_i$$

where i is an integer from 0 to i, i is an integer that is greater than 5, $IA_i$ is the input to the i-th column of PEs 215, $W_i$ is the weight for the i-th column of PEs 215. FIG. 2 shows more than 5 columns of PEs 215. In other embodiments, the layer 210 may include fewer or more columns of PEs 215.

The PEs 215 perform MAC operations. The PEs 215 may also be referred to as neurons in the analog neural network. A PE 215 can receive an input signal and a weight signal, perform a multiply operation on the input signal and weight signal, and generate an output signal. The PEs 215 are connected to each other, as indicated by the dotted lines in FIG. 2. The output signal of a PE 215 is sent to many other PEs 215 (and possibly back to itself) as input signals via the interconnections between PEs 215. The output signal of a PE 215 may incorporate the output signals of one or more other PEs 215 through an accumulate operation of the PE 215. In some embodiments, the PEs 215 are memory devices. Weights of the layer 210 can be stored in the charge or conductance state of the memory devices at their intersections. The propagation of data through the layer 210 is performed in a single step by inputting the data to the columns and deciphering the results at the rows.

As shown in FIG. 2, the output activation (OA) of the layer 210, which is analog signals, is passed to the analog circuit 230. The analog circuit 230 is an analog hardware implementation of an activation function and includes a plurality of analog components. The activation function may be a tanh activation function or a ReLU activation function.

The analog circuit 230 computes the activation function with the output of the layer 210 and outputs new analog signals (OAF). The new analog signals are passed to the layer 220 for further computation. Even though not shown in FIG. 2, the layer 220 may include a plurality of PEs, such as the PEs 215, that can perform MAC operations on the new analog signals. More details regarding analog circuits that compute activation functions are described below in conjunction with FIGS. 4-13.

Conventionally, activation functions are typically implemented using digital circuits. Thus, an ADC is needed at the output of the layer 210 to convert the analog signals to digital signals. Also, a DAC is required at the output of the digital circuits to convert digital data back to analog signals. The power consumption of the analog neural network can be dominated by the back-and-forth data conversions. By using the analog circuit 230 to compute the activation function, the back-and-forth data conversions are eliminated and therefore, reduces the power consumption of the analog neural network.

Example Tanh Activation Function and ReLU Activation Function

Figures 3A, 3B:
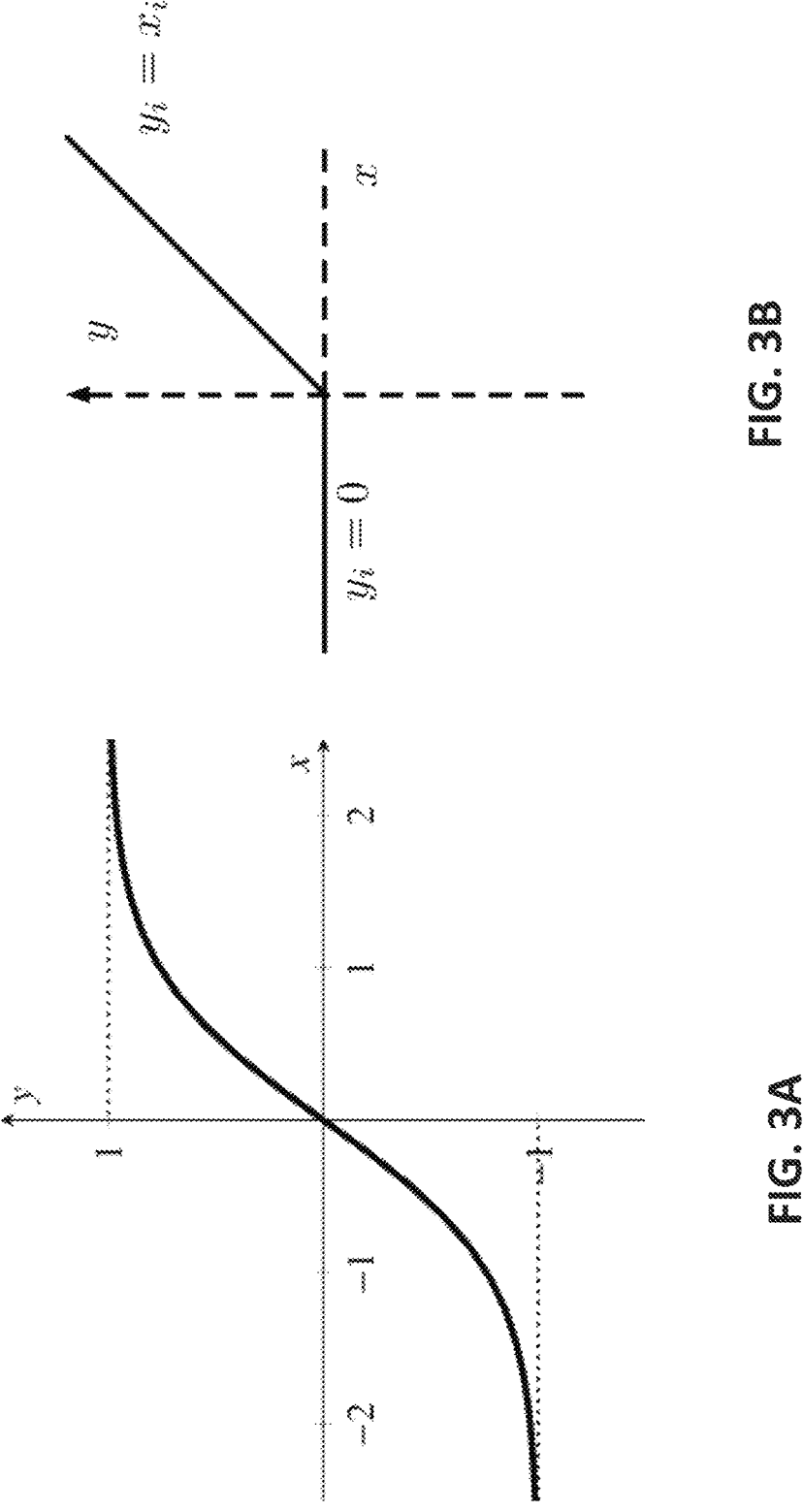
FIG. 3A illustrates a hyperbolic tangent (tan h) activation function, in accordance with various embodiments.
FIG. 3B illustrates a rectified linear unit (ReLU) activation function, in accordance with various embodiments.

FIG. 3A illustrates an example tanh activation function, in accordance with various embodiments. The tanh activation function takes any values as inputs and outputs values in a predetermined range. In the embodiment of FIG. 3A, the predetermined range is from −1 to 1. The larger the input value (e.g., more positive), the closer the output value will be to 1, whereas the smaller the input value (e.g., more negative), the closer the output will be to −1. The tan h activation function can be computed as follows:

$$y = \tanh(x) = \frac{e^x - e^x}{e^x + e^{-x}}$$

where x is input to the tanh activation function, y is output of the tanh activation function, and e is Euler's number, which is a mathematical constant approximately equal to 2.71828. The input and output of the tanh activation function can both be analog signals.

FIG. 3B illustrates an example ReLU activation function, in accordance with various embodiments. The ReLU activation function a piecewise linear function. The output (y) is zero if the input (x) is negative. Otherwise, the output (y) equals the input (x), i.e., the ReLU activation function outputs the input (x) directly if the input (x) is positive. The input and output of the tanh activation function can both be analog signals.

Example Analog Circuits for Tanh Activation Function

Figure 4:
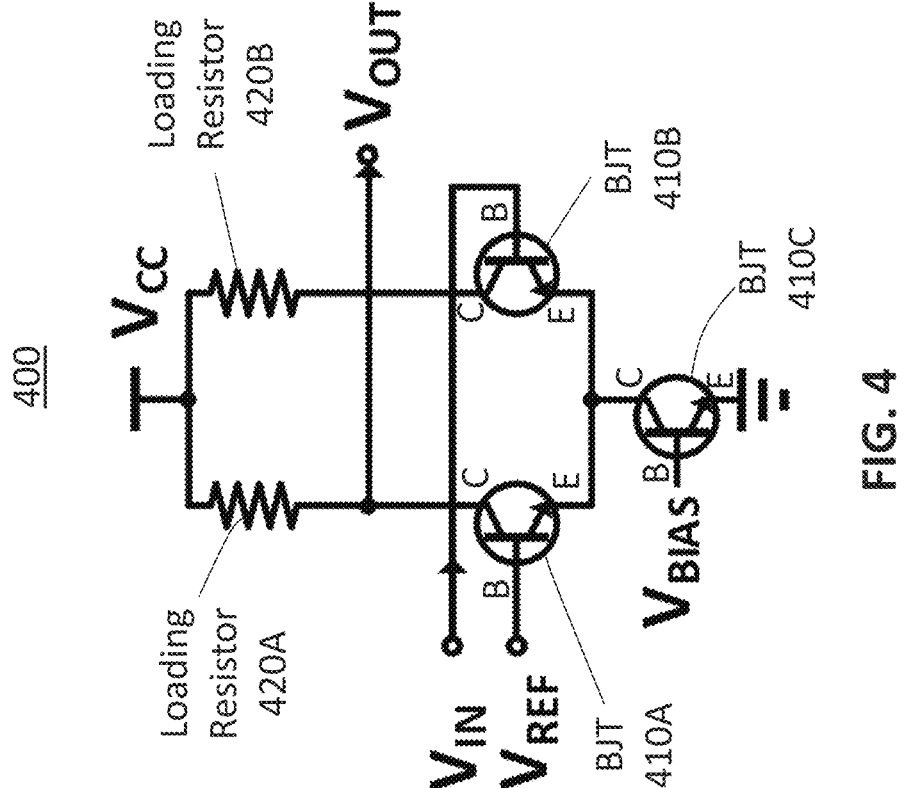
FIG. 4 illustrates an example analog circuit that includes Bipolar Junction Transistors (BJTs) and computes a tanh activation function with single-ended signals, in accordance with various embodiments.

FIG. 4 illustrates an example analog circuit 400 that computes a tanh activation function with single-ended signals, in accordance with various embodiments. The analog circuit 400 can be an embodiment of the analog circuit 230 in FIG. 2. The analog circuit 400 includes three BJTs 410A-C (collectively referred to as BJTs 410 or BJT 410) and two loading resistors 420A and 420B (collectively referred to as loading resistors 420 or loading resistor 420). In other embodiments, the analog circuit 400 may include more, fewer, or different components.

A BJT 410 is a transistor that uses both electrons and electron holes as charge carriers. The BJT 410 includes three differently doped semiconductor regions: an emitter region, a base region, and a collector region. These regions are, respectively, p type, n type and p type in a P-N-P transistor, and n type, p type and n type in an N-P-N transistor. The BJT 410 can have three terminal leads for connection to these regions: emitter (E), base (B), and collector (C). The base is physically located between the emitter and the collector and is made from lightly doped, high-resistivity material. The collector surrounds the emitter region, making it almost impossible for the electrons injected into the base region to escape without being collected. The arrow on the symbol for a BJT 410 indicates the P-N junction between the corresponding base and emitter and points in the direction in which current travels. Small changes in the voltage applied across the base-emitter terminals cause the current between the emitter and the collector to change significantly. This effect can be used to amplify the input voltage.

The two BJTs 410A-B constitute a differential pair. In some embodiments, the two BJTs 410A-B have same characteristics. For instance, the BJTs 410A-B have the same size, the same current gain, the same thermal voltage, the same operating temperature, the same weight, other types of characteristics, or some combination thereof. The two BJTs 410A-B can be identical. The emitter of the BJT 410A and the emitter of the BJT 410B are both coupled to the collector of the BJT 410C. The BJT 410C functions as a current source for the two BJTs 410A-B. The base of the BJT 410C is coupled to a bias voltage. The emitter of the BJT 410C is grounded.

The two loading resistors 420 are coupled to the collectors of the BJTs 410A-B. In some embodiments, the two loading resistors 420A-B have same characteristics. For instance, the two loading resistors 420A-B have the same resistance, the same size, the same operating temperature, the same weight, other types of characteristics, or some combination thereof. The two loading resistors 420A-B can be identical. The loading resistor 420A is connected to the collector of the BJT 410A. The loading resistor 420B is connected to the collector of the BJT 410B.

In the embodiment of FIG. 4, the analog circuit 400 has an input terminal $V_{IN}$, a reference terminal $V_{REF}$, an output terminal $V_{OUT}$, a supply terminal $V_{CC}$, and a bias terminal $V_{BIAS}$. As shown in FIG. 4, the input terminal $V_{IN}$ is coupled to the base of the BJT 410B, the reference terminal $V_{REF}$ is coupled to the base of the BJT 410A, the output terminal $V_{OUT}$ is coupled to the collector of the BJT 410A, the supply terminal $V_{CC}$ is coupled to the loading resistors 420, and the bias terminal $V_{BIAS}$ is coupled to the base of the BJT 410C. The supply terminal $V_{CC}$ receives a supply voltage of the analog circuit 400. The bias terminal $V_{BIAS}$ receives the bias voltage.

The analog circuit 400 receives single-ended signals. The input terminal $V_{IN}$ receives input voltage. The reference terminal $V_{REF}$ receives reference voltage, which can be a constant voltage of a predetermined value. The output terminal $V_{OUT}$ outputs output voltage. The input and output signals of the analog circuit have the following relationship:

$$V_{out} = \alpha_F I_{EE} R_C \tanh\left(\frac{-V_{in}}{2V_T}\right)$$

$$V_{in} = \text{input voltage} - \text{reference voltage}$$

$$V_{out} = \text{reference voltage} - \text{output voltage}$$

$$\alpha_F = \frac{\beta}{\beta + 1}$$

where $V_{in}$ is the input signal of the analog circuit 400, $V_{out}$ is the output signal of the analog circuit 400, $\beta$ is the current gain of the BJT 410A or 410B, $I_{EE}$ is the biasing current of the differential pair, $R_C$ is the resistance of the loading resistor 420, $V_T$ is the thermal voltage of the BJT 410A or 410B.

The relationship between the input signal $V_{in}$ and output signal $V_{out}$, as shown above, follows the tanh activation function described in FIG. 3A with some coefficients. Thus, the analog circuit 400 can be utilized as an activation function of a neural network, e.g., an analog neural network. For instance, the input signal $V_{in}$ is an output of a layer in the neural network and the output signal $V_{out}$ is an input of the next layer in the neural network. Compared with activation functions computed digitally, the analog circuit 400 is more advantageous especially in analog neural networks where the two layers are ACiM arrays. A digital implementation of activation functions would require both a converter to convert the analog output of the first layer to digital signals (as the digital implementation must use digital input) and a converter to convert the digital output of the activation function to analog signals (as the second layer must use analog input). In contrast, the analog circuit 400 does not need either converter. The output of the first layer can be direct input into the analog circuit 400 and the output of the analog circuit 400 can be directly input into the second layer. Thus, using the analog circuit 400 in analog neural networks can improve energy efficiency.

Figure 5:
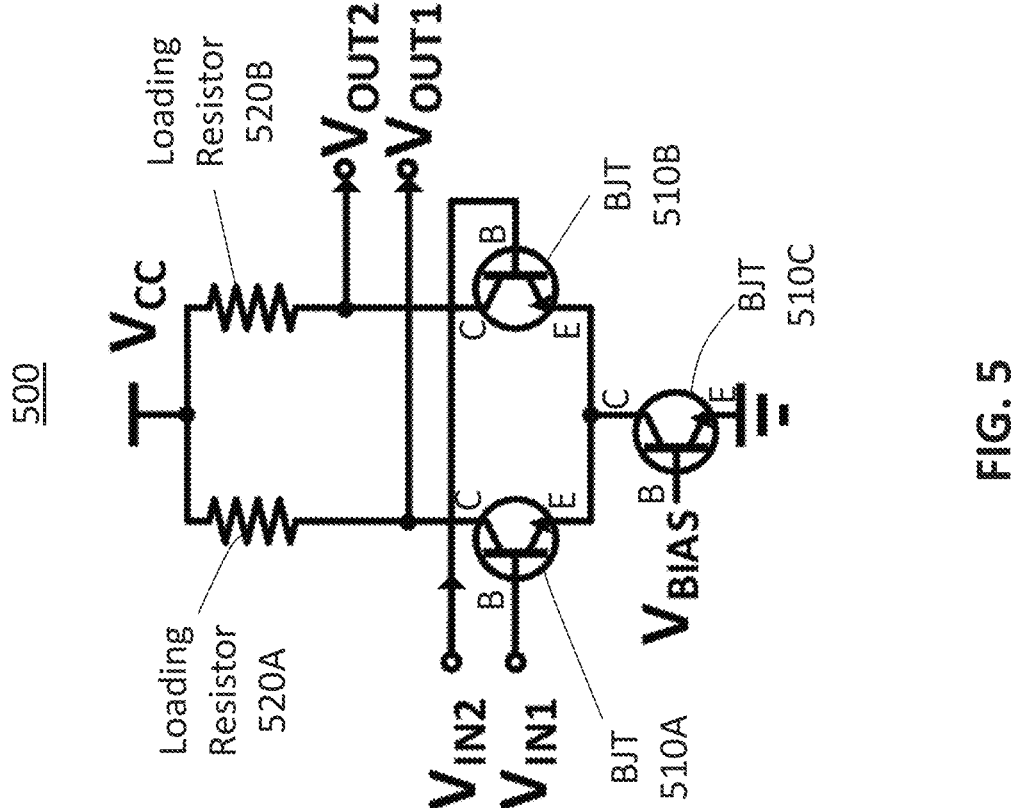
FIG. 5 illustrates an example analog circuit that includes BJTs and computes a tan h activation function with differential signals, in accordance with various embodiments.

FIG. 5 illustrates an example analog circuit that computes a tanh activation function with differential signals, in accordance with various embodiments. The analog circuit 500 can be an embodiment of the analog circuit 230 in FIG. 2. The analog circuit 500 includes three BJTs 510A-C (collectively referred to as BJTs 510 or BJT 510) and two loading resistors 520A and 520B (collectively referred to as loading resistors 520 or loading resistor 520). In other embodiments, the analog circuit 500 may include more, fewer, or different components.

A BJT 510 can be the same as or similar to a BJT 410 described above in conjunction with FIG. 4. The two BJTs 510A-B constitute a differential pair. In some embodiments, the two BJTs 510A-B have same characteristics. For instance, the BJTs 510A-B have the same size, the same current gain, the same thermal voltage, the same operating temperature, the same weight, other types of characteristics, or some combination thereof. The two BJTs 510A-B can be identical. The emitter of the BJT 510A and the emitter of the BJT 510B are both coupled to the collector of the BJT 510C. The BJT 510C functions as a current source for the two BJTs 510A-B. The base of the BJT 510C is coupled to a bias voltage. The emitter of the BJT 510C is grounded.

The two loading resistors 520 are coupled to the collectors of the BJTs 510A-B. In some embodiments, the two loading resistors 520A-B have same characteristics. For instance, the two loading resistors 520A-B have the same resistance, the same size, the same operating temperature, the same weight, other types of characteristics, or some combination thereof. The two loading resistors 520A-B can be identical. The loading resistor 520A is connected to the collector of the BJT 510A. The loading resistor 520B is connected to the collector of the BJT 510B.

Similar to the analog circuit 400, the analog circuit 500 includes a supply terminal $V_{CC}$ coupled to the loading resistors 520 and a bias terminal $V_{BIAS}$ coupled to the base of the BJT 510C. The supply terminal $V_{CC}$ receives a supply voltage. The bias terminal $V_{BIAS}$ receives the bias voltage. However, different from the analog circuit 400, the analog circuit 500 has two input terminals $V_{IN1}$ and $V_{IN2}$ and two output terminals $V_{IN1}$ and $V_{IN2}$. Thus, the analog circuit 500 can receive differential signals. As shown in FIG. 5, the input terminal $V_{IN1}$ is coupled to the base of the BJT 510A, the input terminal $V_{IN2}$ is coupled to the base of the BJT 510B, the output terminal $V_{OUT1}$ is coupled to the collector of the BJT 510A, and the output terminal $V_{OUT2}$ is coupled to the collector of the BJT 510B. The input terminal $V_{IN1}$ receives a first input voltage. The input terminal $V_{IN2}$ receives a second input voltage. The output terminal $V_{OUT1}$ outputs a first output voltage. The output terminal $V_{OUT2}$ outputs a first output voltage.

The input and output signals of the analog circuit 500 have the following relationship:

$$V_{out} = \alpha_F I_{EE} R_C \tanh\left(\frac{-V_{in}}{2V_T}\right)$$

$$V_{in} = \text{first input voltage} - \text{second input voltage}$$

$$V_{out} = \text{first reference voltage} - \text{second output voltage}$$

$$\alpha_F = \frac{\beta}{\beta + 1}$$

where $V_{in}$ is the input signal of the analog circuit 500, $V_{out}$ is the output signal of the analog circuit 500, $\beta$ is the current gain of the BJT 510A or 510B, $I_{EE}$ is the biasing current of the differential pair, $R_C$ is the resistance of the loading resistor 520, $V_T$ is the thermal voltage of the BJT 510A or 510B. The relationship between the input signal $V_{in}$ and output signal $V_{out}$, as shown above, follows the tanh activation function described in FIG. 3A with some coefficients. Thus, the analog circuit 500 can be utilized as an activation function of a neural network, e.g., an analog neural network. For instance, the input signal $V_{in}$ is an output of a layer in the neural network and the output signal $V_{out}$ is an input of the next layer in the neural network. The analog circuit 500 has similar advantageous as the analog circuit 400 over digital implementation of activation functions.

The analog circuits 400 and 500 in FIGS. 4 and 5 use BJTs for the differential pairs. Differential pair can also be implemented with other types of transistors, e.g., MOSFETs. MOSFETs are getting more popular. Many integrated circuit (IC) chips are fabricated with MOSFET technologies. An advantage of a MOSFET is that it requires little input current to control the load current, when compared with BJTs.

Figure 6:
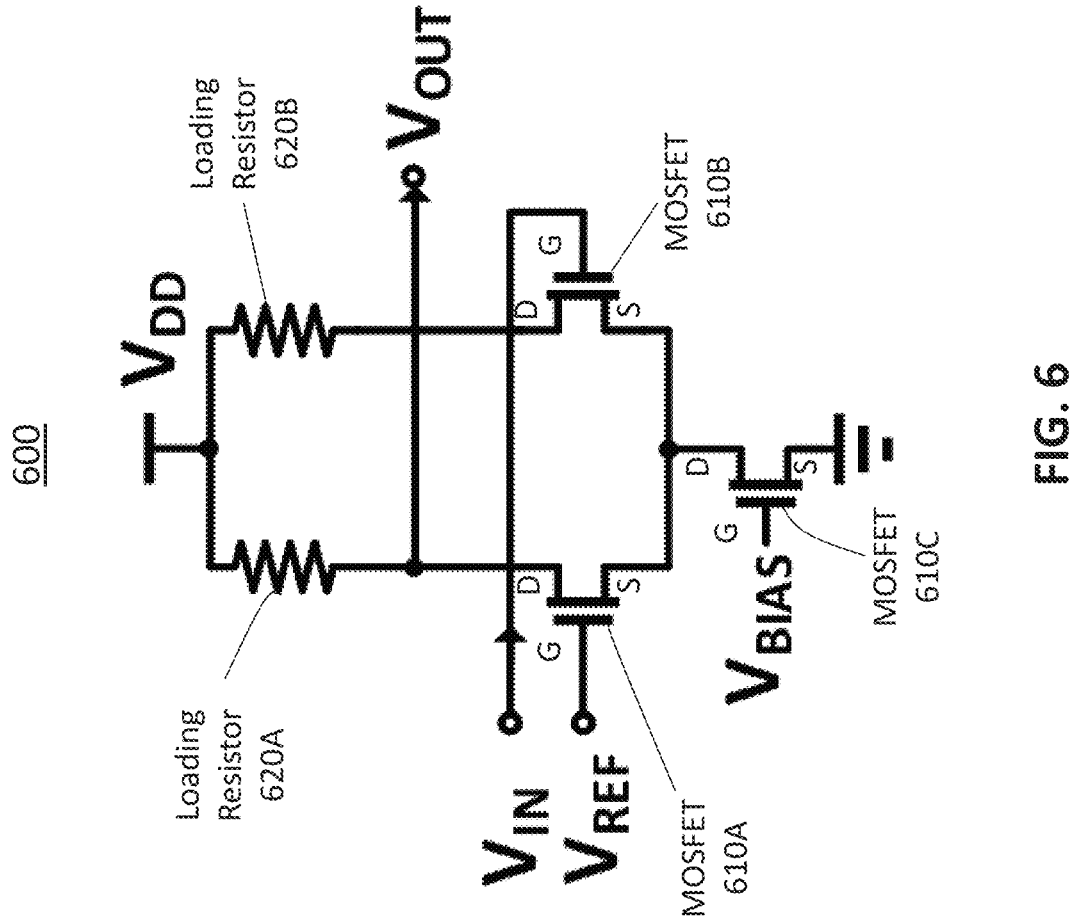
FIG. 6 illustrates an example analog circuit that includes Metal-Oxide-Semiconductor Field-Effect Transistors (MOSFETs) and computes a tanh activation function with single-ended signals, in accordance with various embodiments.

FIG. 6 illustrates an example analog circuit that includes MOSFETs 610A-C and computes a tanh activation function with single-ended signals, in accordance with various embodiments. Different from the analog circuit 400 that uses BJTs 410, the analog circuit 600 includes three MOSFETs 610A-C (collectively referred to as MOSFETs 610 or MOSFET 610). The analog circuit 600 also includes two loading resistors 620A and 620B (collectively referred to as loading resistors 620 or loading resistor 620). In other embodiments, the analog circuit 600 may include more, fewer, or different components. The analog circuit 600 can be an embodiment of the analog circuit 230 in FIG. 2.

A MOSFET 610 is a type of insulated-gate field-effect transistor that can be fabricated by the controlled oxidation of a semiconductor, typically silicon. The operation of the MOSFET 610 is based on is based on the modulation of charge concentration by a MOS capacitance between a body electrode and a gate electrode located above the body and insulated from all other device regions by a gate dielectric layer. The MOSFET 610 includes three terminals: gate (G), source (S), and drain (D). The source is the source of the charge carriers (e.g., electrons for n-channel, holes for p-channel) that flow through the channel. The drain is where the charge carriers leave the channel.

The two MOSFETs 610A-B constitute a differential pair. In some embodiments, the two MOSFETs 610A-B have one or more same characteristics. For instance, the MOSFETs 610A-B have the same size, the same length, the same width, the same oxide capacitance, the same electron mobility, the same operating temperature, the same weight, other types of characteristics, or some combination thereof. The two MOSFETs 610A-B can be identical. The source of the MOSFET 610A and the source of the MOSFET 610B are both coupled to the drain of the MOSFET 610C. The MOSFET 610C functions as a current source for the two MOSFETs 610A-B. The gate of the MOSFET 610C is coupled to a bias voltage. The source of the MOSFET 610C is grounded.

The two loading resistors 620 are coupled to the drains of the MOSFETs 610A-B. In some embodiments, the two loading resistors 620A-B have same characteristics. For instance, the two loading resistors 620A-B have the same resistance, the same size, the same operating temperature, the same weight, other types of characteristics, or some combination thereof. The two loading resistors 620A-B can be identical. The loading resistor 620A is connected to the drain of the MOSFET 610A. The loading resistor 620B is connected to the drain of the MOSFET 610B.

In the embodiment of FIG. 6, the analog circuit 600 has an input terminal $V_{IN}$, a reference terminal $V_{REF}$, an output terminal $V_{OUT}$, a supply terminal $V_{DD}$, and a bias terminal $V_{BIAS}$. As shown in FIG. 6, the input terminal $V_{IN}$ is coupled to the base of the MOSFET 610B, the reference terminal $V_{REF}$ is coupled to the base of the MOSFET 610A, the output terminal $V_{OUT}$ is coupled to the drain of the MOSFET 610A, the supply terminal $V_{CC}$ is coupled to the loading resistors 620, and the bias terminal $V_{BIAS}$ is coupled to the base of the MOSFET 610C. The supply terminal $V_{CC}$ receives a supply voltage of the analog circuit 600. The bias terminal $V_{BIAS}$ receives the bias voltage.

The analog circuit 600 receives single-ended signals. The input terminal $V_{IN}$ receives input voltage. The reference terminal $V_{REF}$ receives reference voltage, which can be a constant voltage of a predetermined value. The output terminal $V_{OUT}$ outputs output voltage. The input and output signals of the analog circuit 600 have the following relationship:

$$V_{out} = -1, \text{when } V_{in} < -\sqrt{\frac{2I_{SS}}{\mu_n C_{ox}\frac{W}{L}}}$$

$$V_{out} = -\frac{1}{2}\mu_n C_{ox}\frac{W}{L}V_{in}\sqrt{\frac{4I_{SS}}{\mu_n C_{ox}\frac{W}{L}} - V_{in}^2 R_D},$$

$$\text{when} - \sqrt{\frac{2I_{SS}}{\mu_n C_{ox}\frac{W}{L}}} < V_{in} < \sqrt{\frac{2I_{SS}}{\mu_n C_{ox}\frac{W}{L}}}$$

$$V_{out} = 1, \text{when } V_{in} < \sqrt{\frac{2I_{SS}}{\mu_n C_{ox}\frac{W}{L}}}$$

$V_{in}$ = input voltage − reference voltage $V_{out}$ = reference voltage − output voltage where $V_{in}$ is the input signal of the analog circuit 600, $V_{out}$ is the output signal of the analog circuit 600, $\mu_n$ is the electron mobility of the MOSFET 610A or 610B, $C_{ox}$ is the oxide capacitance of the MOSFET 610A or 610B, W is the width of the MOSFET 610A or 610B, L is the length of the MOSFET 610A or 610B, $I_{SS}$ is the biasing current of the differential pair, and $R_D$ is the resistance of the loading resistor 620.

The relationship between the input signal $V_{in}$ and output signal $V_{out}$, as shown above, is more complicated than the relationships described above in conjunction with FIGS. 4 and 5. The relationship in the embodiment of FIG. 6 is a piecewise function. When the input is moving away from 0, the output will approach either −1 or +1. When the input is close to 0, the output will follow an equation derived from MOSFET's basic electrical characteristic equation. Even though the relationship is not a strict tanh function, it is very close to the tanh function described above in conjunction with FIG. 3A. The analog circuit 600 can be used as a tanh activation function. The analog circuit 600 has similar advantageous as the analog circuits 400 and 500 over digital implementation of activation functions. More details regarding the comparison between the analog circuit 600 and the analog circuits 400 and 500 are provided below in conjunction with FIG. 9.

Figure 7:
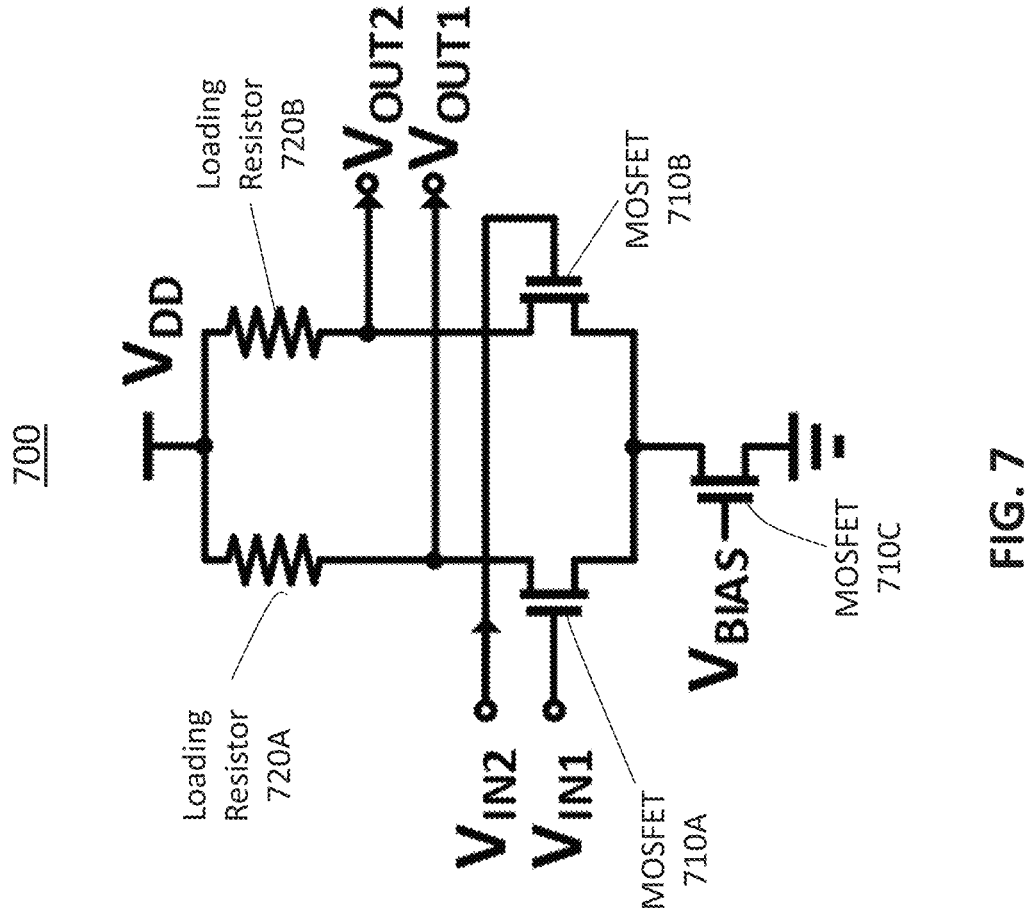
FIG. 7 illustrates an example analog circuit that includes MOSFETs and computes a tan h activation function with differential signals, in accordance with various embodiments.

FIG. 7 illustrates an example analog circuit that includes MOSFETs and computes a tanh activation function with differential signals, in accordance with various embodiments. The analog circuit 700 can be an embodiment of the analog circuit 230 in FIG. 2. The analog circuit 700 includes three MOSFETs 710A-C (collectively referred to as MOSFETs 710 or MOSFET 710). The analog circuit 700 also includes two loading resistors 720A and 720B (collectively referred to as loading resistors 720 or loading resistor 720). In other embodiments, the analog circuit 700 may include more, fewer, or different components.

A MOSFET 710 can be the same as or similar to a MOSFET 610 that is described above in conjunction with FIG. 6. The two MOSFETs 710A-B constitute a differential pair. In some embodiments, the two MOSFETs 710A-B have one or more same characteristics. For instance, the MOSFETs 710A-B have the same size, the same length, the same width, the same oxide capacitance, the same electron mobility, the same operating temperature, the same weight, other types of characteristics, or some combination thereof. The two MOSFETs 710A-B can be identical. The source of the MOSFET 710A and the source of the MOSFET 710B are both coupled to the drain of the MOSFET 710C. The MOSFET 710C functions as a current source for the two MOSFETs 710A-B. The gate of the MOSFET 710C is coupled to a bias voltage. The source of the MOSFET 710C is grounded.

The two loading resistors 720 are coupled to the drains of the MOSFETs 710A-B. In some embodiments, the two loading resistors 720A-B have same characteristics. For instance, the two loading resistors 720A-B have the same resistance, the same size, the same operating temperature, the same weight, other types of characteristics, or some combination thereof. The two loading resistors 720A-B can be identical. The loading resistor 720A is connected to the drain of the MOSFET 710A. The loading resistor 720B is connected to the drain of the MOSFET 710B.

Similar to the analog circuit 600, the analog circuit 700 includes a supply terminal $V_{DD}$ coupled to the loading resistors 720 and a bias terminal $V_{BIAS}$ coupled to the gate of the MOSFET 710C. The supply terminal $V_{DD}$ receives a supply voltage. The bias terminal $V_{BIAS}$ receives the bias voltage. However, different from the analog circuit 600, the analog circuit 700 has two input terminals $V_{IN1}$ and $V_{IN2}$ and two output terminals $V_{IN1}$ and $V_{IN2}$. Thus, the analog circuit 700 can receive differential signals. As shown in FIG. 7, the input terminal $V_{IN1}$ is coupled to the gate of the MOSFET 710A, the input terminal $V_{IN2}$ is coupled to the gate of the MOSFET 710B, the output terminal $V_{OUT1}$ is coupled to the drain of the MOSFET 710A, and the output terminal $V_{OUT2}$ is coupled to the drain of the MOSFET 710B. The input terminal $V_{IN1}$ receives a first input voltage. The input terminal $V_{IN2}$ receives a second input voltage. The output terminal $V_{OUT1}$ outputs a first output voltage. The output terminal $V_{OUT2}$ outputs a first output voltage.

The input and output signals of the analog circuit 700 have the following relationship:

$$V_{out} = -1, \text{ when } V_{in} < -\sqrt{\frac{2I_{SS}}{\mu_n C_{ox}\frac{W}{L}}}$$

$$V_{out} = -\frac{1}{2}\mu_n C_{ox}\frac{W}{L}V_{in}\sqrt{\frac{4I_{ss}}{\mu_n C_{ox}\frac{W}{L}} - V_{in}^2 R_D},$$

$$\text{when } -\sqrt{\frac{2I_{SS}}{\mu_n C_{ox}\frac{W}{L}}} < V_{in} < \sqrt{\frac{2I_{SS}}{\mu_n C_{ox}\frac{W}{L}}}$$

$$V_{out} = 1, \text{ when } V_{in} < \sqrt{\frac{2I_{SS}}{\mu_n C_{ox}\frac{W}{L}}}$$

$V_{in}$ = first input voltage – second input voltage $V_{out}$ = first reference voltage – second output voltage where $V_{in}$ is input signal of the analog circuit 700, $V_{out}$ is output signal of the analog circuit 700, $\mu_n$ is the electron mobility of the MOSFET 710A or 710B, $C_{ox}$ is the oxide capacitance of the MOSFET 710A or 710B, W is the width of the MOSFET 710A or 710B, L is the length of the MOSFET 710A or 710B, $I_{SS}$ is the biasing current of the differential pair, and $R_D$ is the resistance of the loading resistor 720.

Similar to the analog circuit 600, the analog circuit 700 can be utilized as a tan h activation function of a neural network, e.g., an analog neural network. For instance, the input signal $V_{in}$ is an output of a layer in the neural network and the output signal $V_{out}$ is an input of the next layer in the neural network. The analog circuit 700 has similar advantageous as the analog circuit 600 over digital implementation of activation functions.

Figure 8:
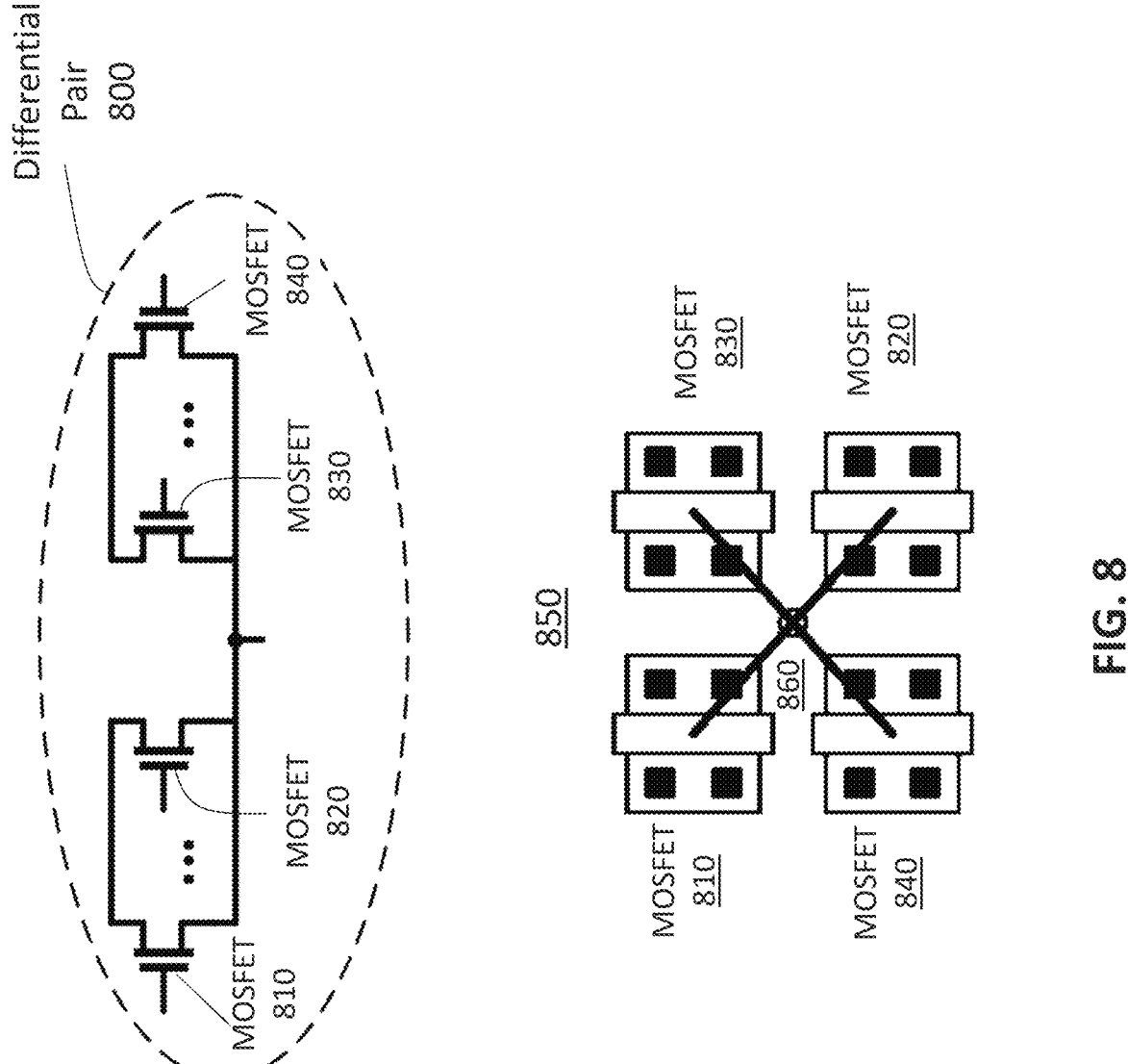
FIG. 8 illustrates a differential pair that has a common centroid layout, in accordance with various embodiments.

FIG. 8 illustrates a differential pair 800 that has a common centroid layout 850, in accordance with various embodiments. The differential pair 800 includes four MOSFETs 810, 820, 830, and 840. Each of the MOSFETs may be the same as or similar to a MOSFET 610 in the differential pair of the analog circuit 600 described above in conjunction with FIG. 6. Different from the differential pair of the analog circuit 600 that includes two MOSFETs 610A-B, the differential pair 800 includes four MOSFETs 810, 820, 830, and 840. The MOSFETs 810 and 820 are in a first group and are arranged in parallel to each other. The MOSFETs 830 and 840 are in a second group and are arranged in parallel to each other. The MOSFETs 810, 820, 830, and 840 are arranged in accordance with the common centroid layout 850, where the centroid of the first group and the centroid of the second group are both located at the point 860. In other words, the centroid of the first group coincides with the centroid of the second group. The MOSFETs 810, 820, 830, and 840 have one or more same characteristics. For instance, the MOSFETs 810, 820, 830, and 840 have the same size, the same length, the same width, the same oxide capacitance, the same electron mobility, the same operating temperature, the same weight, other types of characteristics, or some combination thereof. In some embodiments, the MOSFETs 810, 820, 830, and 840 are identical.

The differential pair 800 can be used to replace the differential pair in the analog circuit 600 or the analog circuit 700. For purpose of illustration and simplicity, the differential pair 800 includes four MOSFETs. In other embodiments, the differential pair 800 may include a different number of MOSFETs, such as eight, sixteen, and so on. Also, even though FIG. 8 uses MOSFET transistors as example, other types of transistors, such as BJT transistors, can also be arranged in accordance with the common centroid layout.

Figure 9:
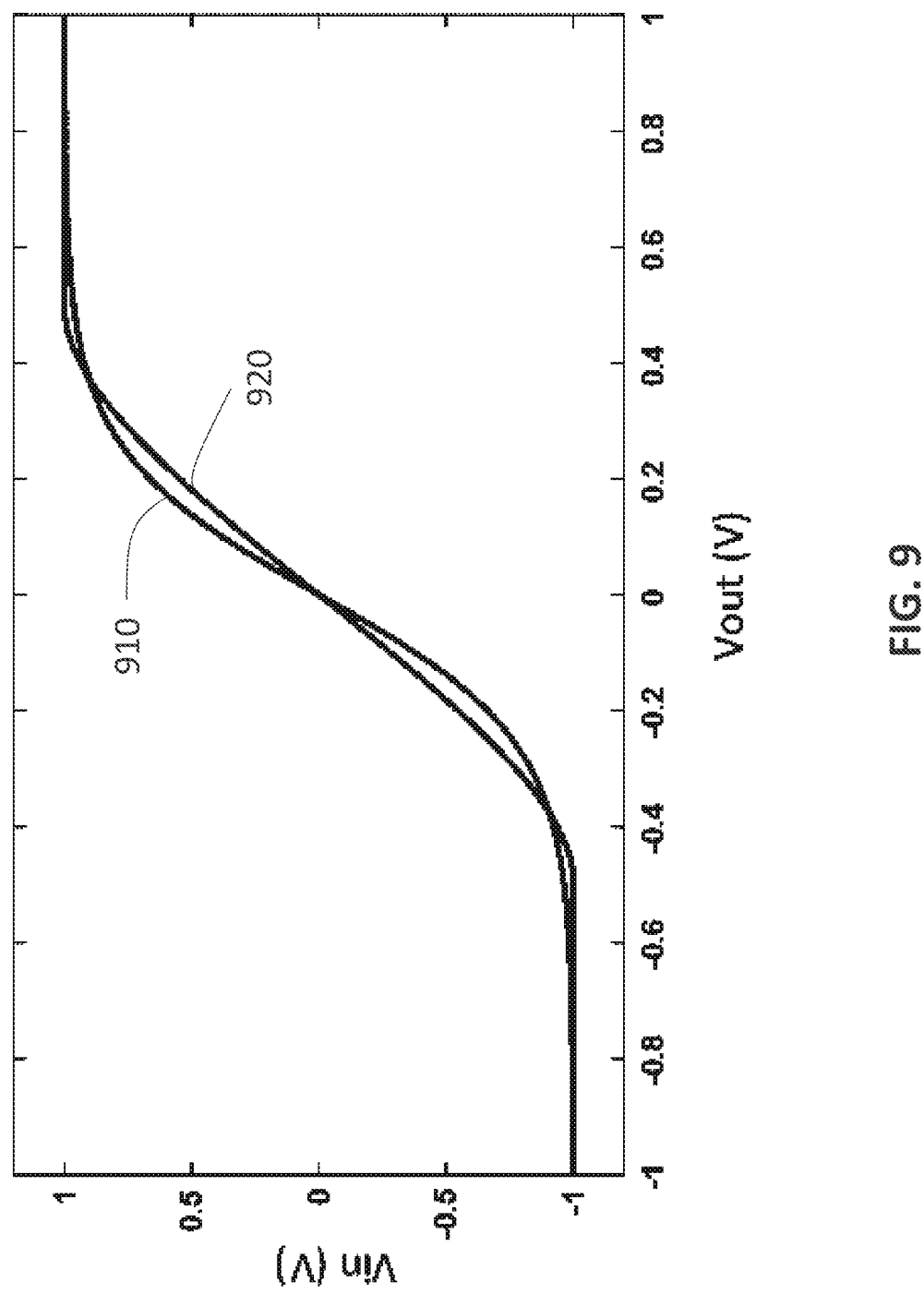
FIG. 9 shows example transfer curves of an analog circuit including BJTs and an analog circuit including MOSFETs, in accordance with various embodiments.

FIG. 9 shows example transfer curves 910 and 920 of an analog circuit including BJTs and an analog circuit including MOSFETs, in accordance with various embodiments. The transfer curve 910 represents the relationship between input signal $V_{in}$ and output signal $V_{out}$ of the analog circuit including BJTs. Examples of the analog circuit includes the analog circuits 400 and 500 described above in conjunction with FIGS. 4 and 5, respectively. The transfer curve 920 represents the relationship between input signal $V_{in}$ and output signal $V_{out}$ of the analog circuit including MOSFETs. Examples of the analog circuit includes the analog circuits 600 and 700 described above in conjunction with FIGS. 6 and 7, respectively.

In the embodiment of FIG. 9, the transfer curve 910 matches the tanh activation function shown in FIG. 3A. The transfer curve 920, even though does not completely match the tanh activation function shown in FIG. 3A, is very close to the tanh activation function. Accordingly, both the analog circuit including BJTs and the analog circuit including MOSFETs can be used as analog hardware implementation of tanh activation functions.

Example Analog Circuits for ReLU Activation Function

Figure 10:
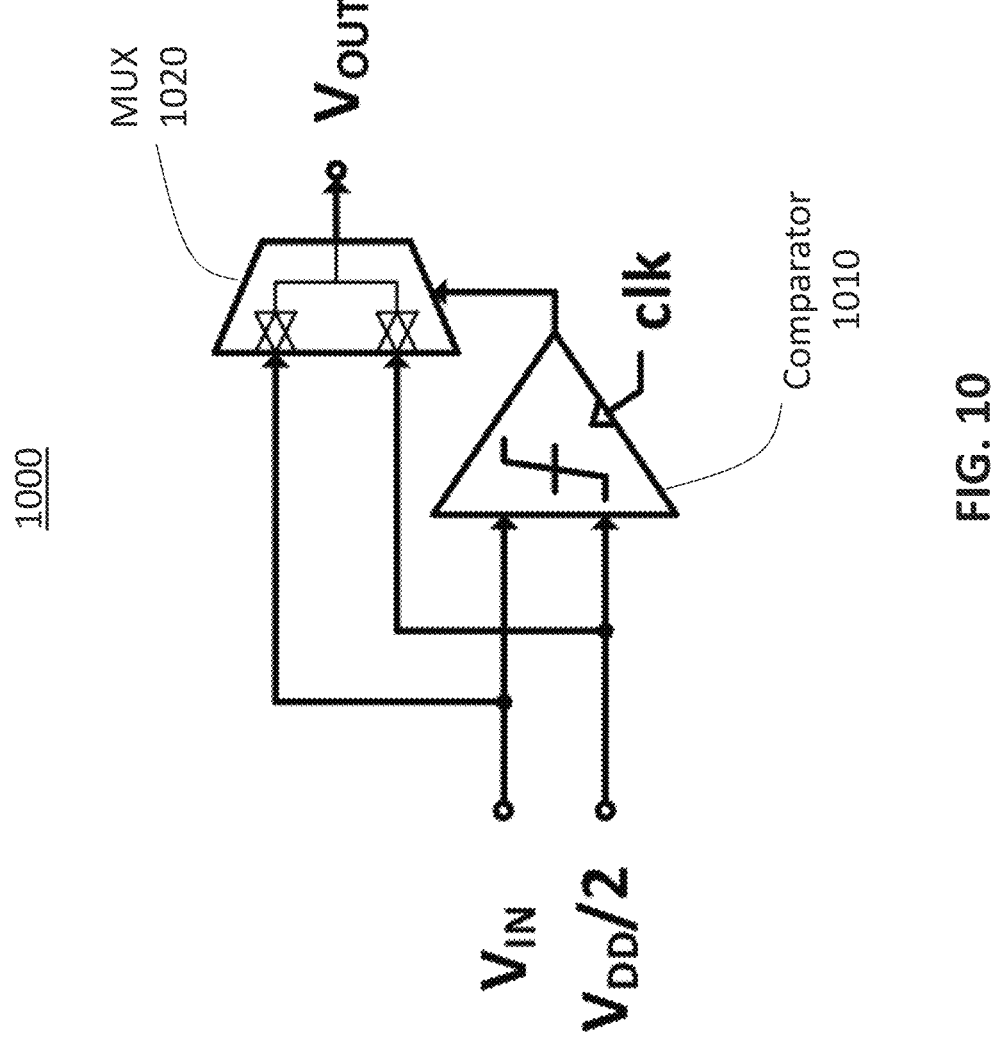
FIG. 10 illustrates an example analog circuit that computes a ReLU activation function with single-ended signals, in accordance with various embodiments.

FIG. 10 illustrates an example analog circuit 1000 that computes the ReLU activation function with single-ended signals, in accordance with various embodiments. The analog circuit 1000 can be an embodiment of the analog circuit 230 in FIG. 2. The analog circuit 1000 includes a comparator 1010 and a MUX 1020. In other embodiments, the analog circuit 1000 includes more, fewer, or different components.

The comparator 1010 receives two voltages and can compare the two voltages and output a signal indicating which voltage is larger. The MUX 1020 can switch multiple input lines to a single output line. As shown in FIG. 10, the comparator 1010 has an input terminal that receives an input voltage $V_{in}$ and a reference terminal that receives a reference voltage $V_{DD}/2$. In some embodiments, the reference voltage $V_{DD}/2$ is zero. In other embodiments, the reference voltage can be above zero, i.e., positive, or below zero, i.e., negative. The output of the comparator 1010 controls the selection node of the MUX 1020. If the input voltage Vi, is greater than the reference voltage $V_{DD}/2$, the MUX 1020 will let the output terminal connect to the input terminal so that the output voltage $V_{OUT}$ equals the input voltage $V_{in}$. Otherwise, the MUX 1020 will let the output terminal connect to the reference terminal so that the output voltage $V_{OUT}$ equals the reference voltage $V_{DD}/2$, which is zero.

The relationship between the input voltage $V_{in}$ and the output voltage $V_{out}$ matches the relationship of the input and output of the ReLU activation function shown in FIG. 3B. Thus, the analog circuit 1000 can be used as an analog hardware implementation of the ReLU activation function. The analog circuit 1000 are more advantageous than digital implementations of the ReLU activation function, especially for application in analog neural networks. A digital ReLU would require a group of registers (the register amount can correspond to the data bitlength) to buffer the digital data comes to the ReLU module before sending to the digital MUX. The analog circuit 1000 does not require such registers and therefore, reduces hardware and saves energy. Also, the size of the analog circuit 1000 is smaller than the combined size of the registers, so using the analog circuit 1000 can save space.

Figure 11:
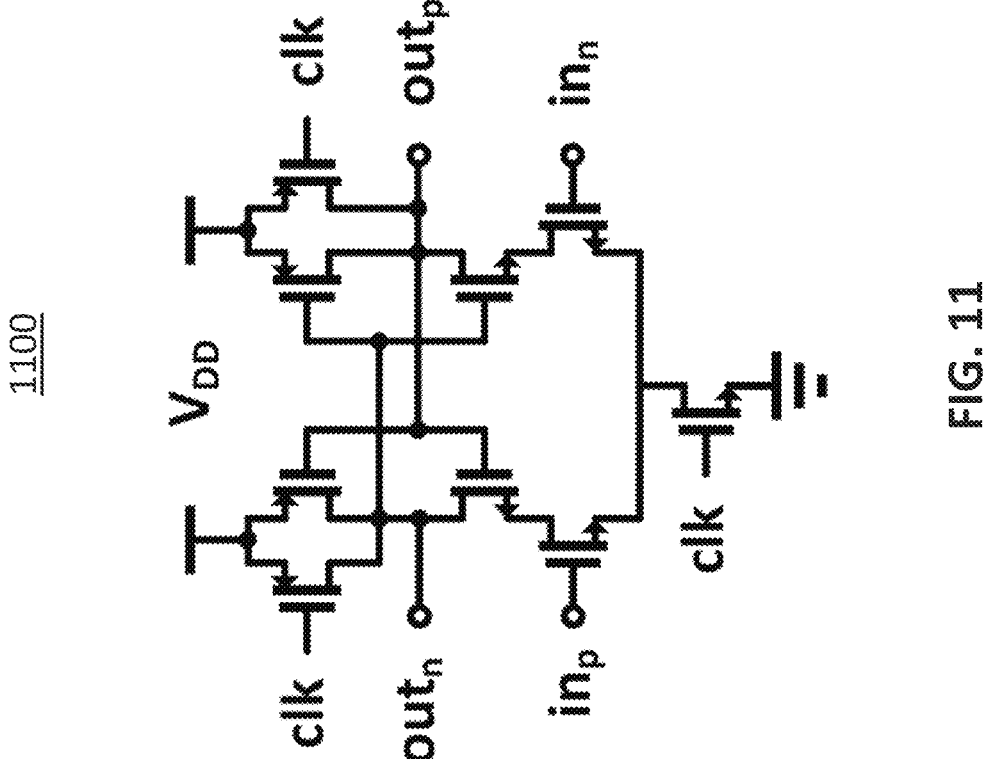
FIG. 11 illustrates an example dynamic comparator, in accordance with various embodiments.

In the embodiment of FIG. 10, both the comparator 1010 and the MUX 1020 are analog. In some embodiments, the comparator 1010 is a dynamic comparator. FIG. 11 illustrates an example dynamic comparator 1100, in accordance with various embodiments. The comparator 1100 is an embodiment of the comparator 1010. The comparator 1100 is clocked and can provide an output after the transition of the clock (clk).

Figure 12:
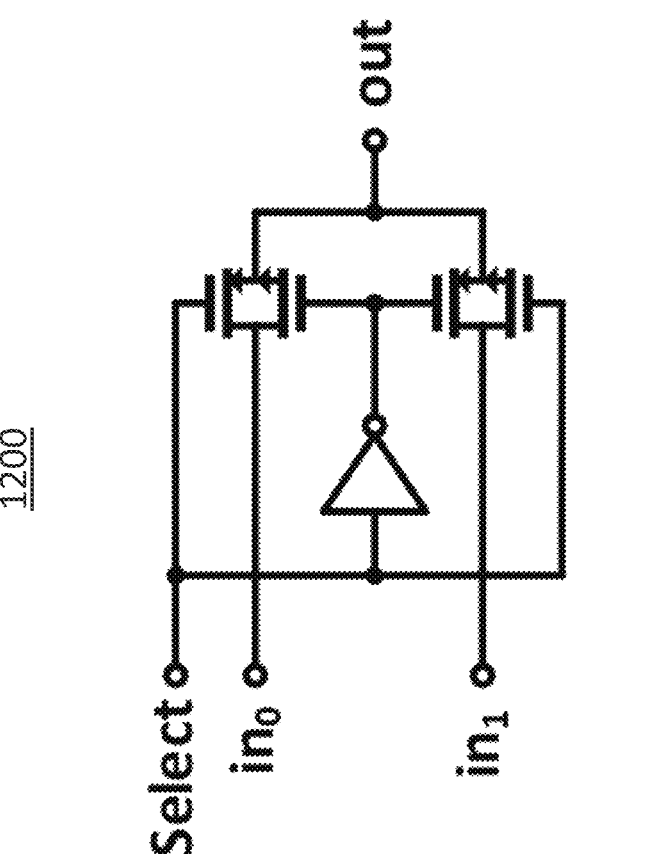
FIG. 12 illustrates an example analog multiplexer (MUX), in accordance with various embodiments.

The MUX 1020 can be a transmission-gate based MUX. FIG. 12 illustrates an example transmission-gate based MUX 1200, in accordance with various embodiments. The MUX 1200 is an embodiment of the MUX 1020. The MUX 1200 has two inputs ($in_0$ and $in_1$ in FIG. 12) which corresponds to the input voltage $V_{in}$ and the reference voltage $V_{DD}/2$, respectively. The MUX 1200 has an output (out in FIG. 12), which corresponds to the output voltage $V_{OUT}$. The MUX 1200 selects one of the inputs as the output.

Figure 13:
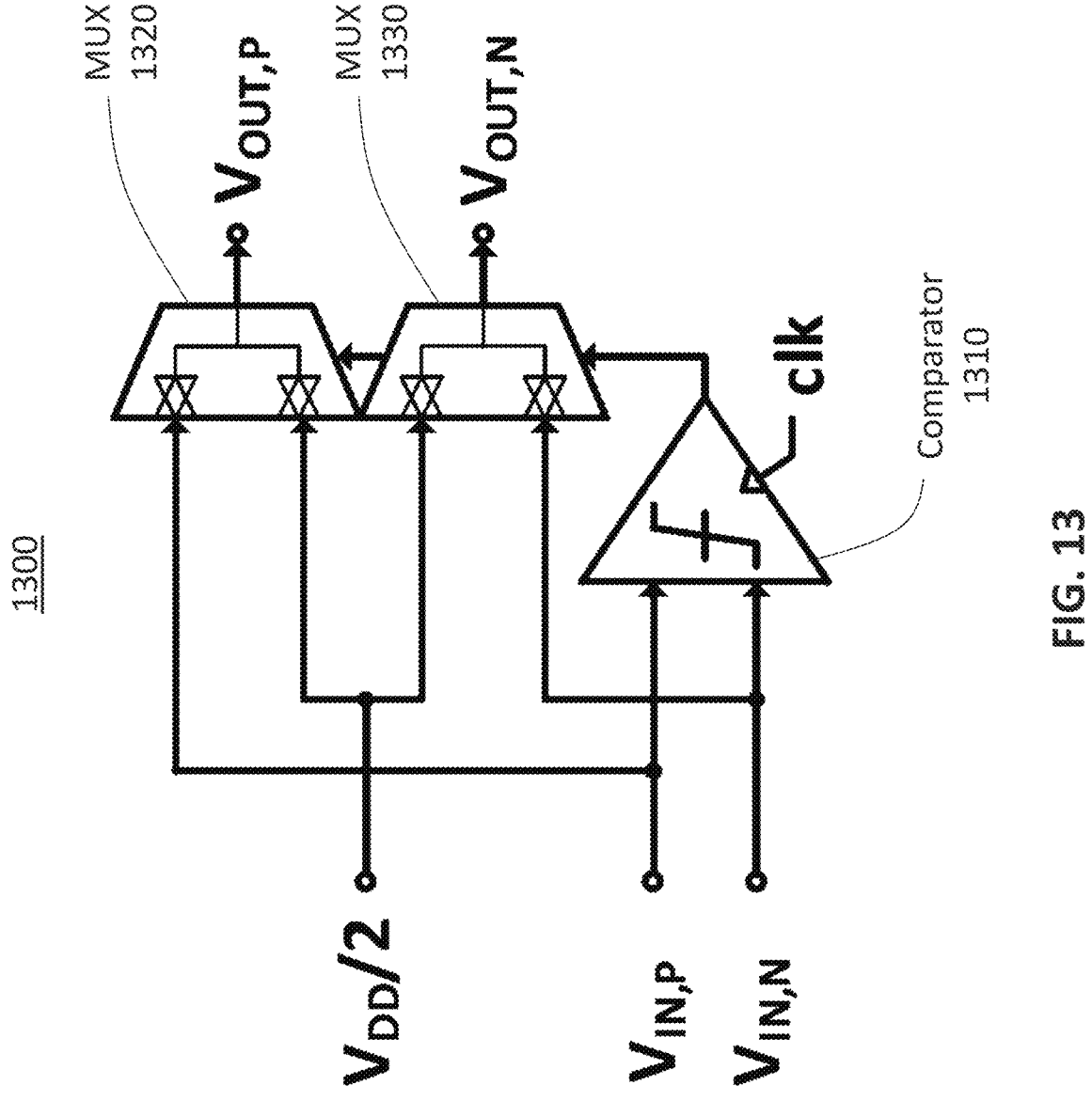
FIG. 13 illustrates an example analog circuit that computes a ReLU activation function with differential signals, in accordance with various embodiments.

FIG. 13 illustrates an example analog circuit 1300 that computes a ReLU activation function with differential signals, in accordance with various embodiments. The analog circuit 1300 includes a comparator 1310 and two MUXs 1320 and 1330. In other embodiments, the analog circuit 1300 includes more, fewer, or different components.

The analog circuit 1300 can be used in modules where differential signal format is adopted, e.g., to mitigate the impact of PVT (process, voltage, and temperature) variations. The analog circuit 1300 provides two signal paths: one including the comparator 1310 and the MUX 1320, the other one including the comparator 1310 and the MUX 1330. As shown in FIG. 13, the comparator 1310 has two input terminals to receive two input voltages $V_{IN,P}$ and $V_{IN,N}$. The analog circuit 1300 has a reference terminal to receive a reference voltage $V_{DD}/2$, which can be zero. The two MUXs 1320 and 1330 are connected to the two inputs and controlled by the output of the comparator 1310. The MUX 1320 receives the input voltage $V_{IN,P}$ and the reference voltage $V_{DD}/2$. The MUX 1330 receives the input voltage $V_{IN,N}$ and the reference voltage $V_{DD}/2$.

In some embodiments, one of the signal paths is for positive input signals and the other signal path is for negative input signals. For instance, the comparator 1310 and the MUX 1320 constitute the positive signal path. They can receive positive input signals and output positive output signals. The comparator 1310 and the MUX 1330 constitute the negative signal path. They can receive negative input signals and output negative output signals. The actual input signal can be equal to the difference between the positive input signal and the negative input signal. Similarly, the actual output signal can be equal to the difference between the positive output signal and the negative output signal.

The comparator 1310 receives two voltages and can compare the two voltages and output a signal indicating which voltage is larger. The MUX 1320 can switch multiple input lines to a single output line. As shown in FIG. 13, the comparator 1310 has an input terminal that receives an input voltage $V_{in}$ and a reference terminal that receives a reference voltage $V_{DD}/2$. In some embodiments, the reference voltage $V_{DD}/2$ is zero. In other embodiments, the reference voltage can be above zero, i.e., positive, or below zero, i.e., negative. The output of the comparator 1310 controls the selection node of the MUX 1320. If the input voltage $V_{in}$ is greater than the reference voltage $V_{DD}/2$, the MUX 1320 will let the output terminal connect to the input terminal so that the output voltage $V_{OUT}$ equals the input voltage $V_{in}$. Otherwise, the MUX 1320 will let the output terminal connect to the reference terminal so that the output voltage $V_{OUT}$ equals the reference voltage $V_{DD}/2$, which is zero.

The relationship between the input voltage $V_{in}$ and the output voltage $V_{OUT}$ matches the relationship of the input and output of the ReLU activation function shown in FIG. 3B. Thus, the analog circuit 1300 can be used as an analog hardware implementation of the ReLU activation function. The analog circuit 1300 is more advantageous than digital implementations of the ReLU activation function, especially for applications in analog neural networks. A digital ReLU would require a group of registers (the register amount can correspond to the data bitlength) to buffer the digital data comes to the ReLU module before sending to the digital MUX. The analog circuit 1300 does not require such registers and therefore, reduces hardware and saves energy. Also, the size of the analog circuit 1300 is smaller than the combined size of the registers, so using the analog circuit 1300 can save space.

Example DL Environment

FIG. 14 illustrates a DL environment 1400, in accordance with various embodiments. The DL environment 1400 includes a DL server 1410 and a plurality of client devices 1420 (individually referred to as client device 1420). The DL server 1410 is connected to the client devices 1420 through a network 1440. In other embodiments, the DL environment 1400 may include fewer, more, or different components.

The DL server 1410 trains DL models using neural networks. A neural network is structured like the human brain and consists of artificial neurons, also known as nodes. These nodes are stacked next to each other in three types of layers: input layer, hidden layer(s), and output layer. Data provides each node with information in the form of inputs. The node multiplies the inputs with random weights, computes them, and adds a bias. Finally, non-linear functions, also known as activation functions, are applied to determine which neuron to fire. The DL server 1410 can use various types of DNNs, such as CNN, graph neural network (GNN), recurrent neural network (RNN), generative adversarial network (GAN), long short term memory network (LSTMN), and so on. During the process of training the DL models, the neural networks use unknown elements in the input distribution to extract features, group objects, and discover useful data patterns. The DL models can be used to solve various problems, e.g., making predictions, classifying images, and so on. The DL server 1410 may build DL models specific to particular types of problems that need to be solved. A DL model is trained to receive an input and outputs the solution to the particular problem.

In FIG. 14, the DL server 1410 includes a DNN system 1450, a database 1460, and a distributer 1470. The DNN system 1450 trains DNNs. The DNNs can be used to process images, e.g., images captured by autonomous vehicles, medical devices, satellites, and so on. In an embodiment, a DNN receives an input image and outputs classifications of objects in the input image. An example of the DNNs is the DNN 100 described above in conjunction with FIG. 1. In some embodiments, the DNN system 1450 can compress the trained DNNs to reduce the sizes of the trained DNNs. As the compressed DNNs has a smaller size, application of the compressed DNNs requires less time and computing resources (e.g., memory, processor, etc.) compared with uncompressed DNNs. The compressed DNNs may be used on low memory sparsity balancing systems, like mobile phones, IOT edge devices, and so on. More details regarding the DNN system 1450 are described below in conjunction with FIG. 11.

The database 1460 stores data received, used, generated, or otherwise associated with the DL server 1410. For example, the database 1460 stores a training dataset that the DNN system 1450 uses to train DNNs. In an embodiment, the training dataset is an image gallery that can be used to train a DNN for classifying images. The training dataset may include data received from the client devices 1420. As another example, the database 1460 stores hyperparameters of the neural networks built by the DL server 1410.

The distributer 1470 distributes DL models generated by the DL server 1410 to the client devices 1420. In some embodiments, the distributer 1470 receives a request for a DNN from a client device 1420 through the network 1440. The request may include a description of a problem that the client device 1420 needs to solve. The request may also include information of the client device 1420, such as information describing available computing resource on the client device. The information describing available computing resource on the client device 1420 can be information indicating network bandwidth, information indicating available memory size, information indicating processing power of the client device 1420, and so on. In an embodiment, the distributer may instruct the DNN system 1450 to generate a DNN in accordance with the request. The DNN system 1450 may generate a DNN based on the description of the problem. Alternatively or additionally, the DNN system 1450 may compress a DNN based on the information describing available computing resource on the client device.

In another embodiment, the distributer 1470 may select the DNN from a group of pre-existing DNNs based on the request. The distributer 1470 may select a DNN for a particular client device 1430 based on the size of the DNN and available resources of the client device 1430. In embodiments where the distributer 1470 determines that the client device 1430 has limited memory or processing power, the distributer 1470 may select a compressed DNN for the client device 1430, as opposed to an uncompressed DNN that has a larger size. The distributer 1470 then transmits the DNN generated or selected for the client device 1420 to the client device 1420.

In some embodiments, the distributer 1470 may receive feedback from the client device 1420. For example, the distributer 1470 receives new training data from the client device 1420 and may send the new training data to the DNN system 1450 for further training the DNN. As another example, the feedback includes an update of the available computer resource on the client device 1420. The distributer 1470 may send a different DNN to the client device 1420 based on the update. For instance, after receiving the feedback indicating that the computing resources of the client device 1420 have been reduced, the distributer 1470 sends a DNN of a smaller size to the client device 1420.

The client devices 1420 receive DNNs from the distributer 1470 and applies the DNNs to solve problems, e.g., to classify objects in images. In various embodiments, the client devices 1420 input images into the DNNs and uses the output of the DNNs for various applications, e.g., visual reconstruction, augmented reality, robot localization and navigation, medical diagnosis, weather prediction, and so on. A client device 1420 may be one or more computing devices capable of receiving user input as well as transmitting and/or receiving data via the network 1440. In one embodiment, a client device 1420 is a conventional computer sparsity balancing system, such as a desktop or a laptop computer. Alternatively, a client device 1420 may be a device having computer functionality, such as a personal digital assistant (PDA), a mobile telephone, a smartphone, an autonomous vehicle, or another suitable device. A client device 1420 is configured to communicate via the network 1440. In one embodiment, a client device 1420 executes an application allowing a user of the client device 1420 to interact with the DL server 1410 (e.g., the distributer 1470 of the DL server 1410). The client device 1420 may request DNNs or send feedback to the distributer 1470 through the application. For example, a client device 1420 executes a browser application to enable interaction between the client device 1420 and the DL server 1410 via the network 1440. In another embodiment, a client device 1420 interacts with the DL server 1410 through an application programming interface (API) running on a native operating sparsity balancing system of the client device 1420, such as IOS® or ANDROID™.

In an embodiment, a client device 1420 is an integrated computing device that operates as a standalone network-enabled device. For example, the client device 1420 includes display, speakers, microphone, camera, and input device. In another embodiment, a client device 1420 is a computing device for coupling to an external media device such as a television or other external display and/or audio output sparsity balancing system. In this embodiment, the client device 1420 may couple to the external media device via a wireless interface or wired interface (e.g., an HDMI cable) and may utilize various functions of the external media device such as its display, speakers, microphone, camera, and input devices. Here, the client device 1420 may be configured to be compatible with a generic external media device that does not have specialized software, firmware, or hardware specifically for interacting with the client device 1420.

The network 1440 supports communications between the DL server 1410 and client devices 1420. The network 1440 may comprise any combination of local area and/or wide area networks, using both wired and/or wireless communication sparsity balancing systems. In one embodiment, the network 1440 may use standard communications technologies and/or protocols. For example, the network 1440 may include communication links using technologies such as Ethernet, 8010.11, worldwide interoperability for microwave access (WiMAX), 3G, 4G, code division multiple access (CDMA), digital subscriber line (DSL), etc. Examples of networking protocols used for communicating via the network 1440 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1440 may be represented using any suitable format, such as hypertext markup language (HTML) or extensible markup language (XML). In some embodiments, all or some of the communication links of the network 1440 may be encrypted using any suitable technique or techniques.

Example DNN System

Figure 15:
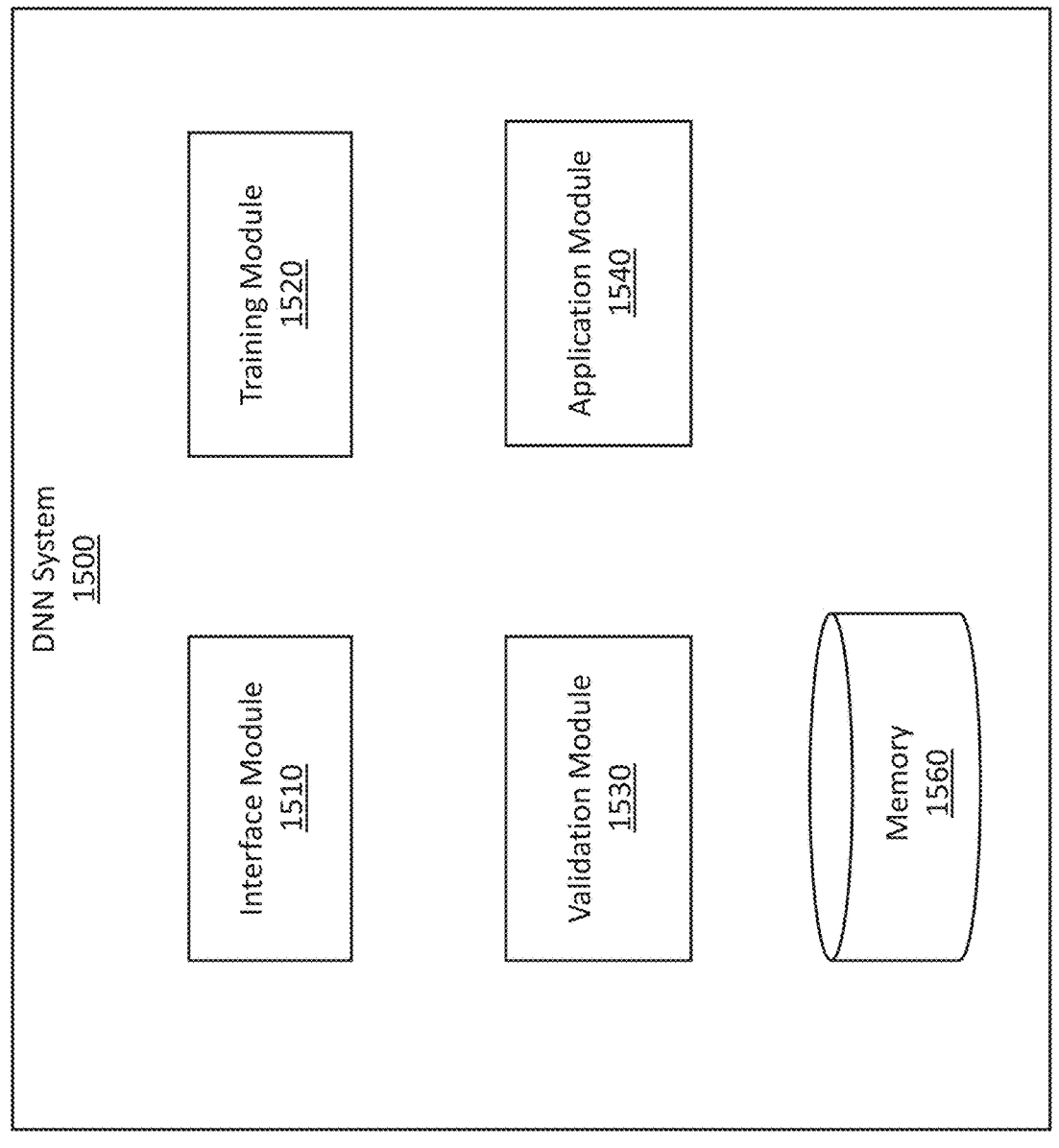
FIG. 15 is a block diagram of a DNN system, in accordance with various embodiments.

FIG. 15 is a block diagram of an example DNN system 1500, in accordance with various embodiments. The DNN system 1500 is an embodiment of the DNN system 1450 in FIG. 14. The DNN system 1500 trains DNNs for various tasks, such as image classification, learning relationships between biological cells (e.g., DNA, proteins, etc.), control behaviors for devices (e.g., robots, machines, etc.), and so on. The DNN system 1500 includes an interface module 1510, a training module 1520, a validation module 1530, an inference module 1540, and a memory 1550. In other embodiments, alternative configurations, different or additional components may be included in the DNN system 1500. Further, functionality attributed to a component of the DNN system 1500 may be accomplished by a different component included in the DNN system 1500 or a different system. The DNN system 1500 or a component of the DNN system 1500 (e.g., the training module 1520 or inference module 1540) may include the computing system 1600 described below in conjunction with FIG. 16.

The interface module 1510 facilitates communications of the DNN system 1500 with other systems. For example, the interface module 1510 establishes communications between the DNN system 1500 with an external database to receive data that can be used to train DNNs or input into DNNs to perform tasks. As another example, the interface module 1510 supports the DNN system 1500 to distribute DNNs to other systems, e.g., computing devices configured to apply DNNs to perform tasks.

The training module 1520 trains DNNs by using a training dataset. The training module 1520 forms the training dataset. In an embodiment where the training module 1520 trains an DNN to recognize objects in images, the training dataset includes training images and training labels. The training labels describe ground truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 1530 to validate performance of a trained DNN. The portion of the training dataset not including the tuning subset and the validation subset may be used to train the DNN.

The training module 1520 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the DL algorithm works through the entire training dataset. One epoch means that each training sample in the training dataset has had an opportunity to update the parameters inside the DNN. An epoch may include one or more batches. The number of epochs may be 15, 150, 500, 1500, or even larger.

The training module 1520 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN convert the input image to a feature map that is represented by a tensor specifying the feature map height, the feature map width, and the feature map channels (e.g., red, green, blue images include three channels). A pooling layer is used to reduce the spatial volume of input image after convolution. It is used between two convolution layers. A fully connected layer involves weights, biases, and neurons. It connects neurons in one layer to neurons in another layer. It is used to classify images between different category by training.

In the process of defining the architecture of the DNN, the training module 1520 also adds an activation function to a hidden layer or the output layer. An activation function of a layer transforms the weighted sum of the input of the layer to an output of the layer. The activation function may be, for example, a ReLU activation function, a tangent activation function, or other types of activation functions.

After the training module 1520 defines the architecture of the DNN, the training module 1520 inputs a training dataset into the DNN. The training dataset includes a plurality of training samples. An example of a training sample includes an object in an image and a ground truth label of the object. The training module 1520 modifies the parameters inside the DNN ("internal parameters of the DNN") to minimize the error between labels of the training objects that are generated by the DNN and the ground truth labels of the objects. The internal parameters include weights of filters in the convolutional layers of the DNN. In some embodiments, the training module 1520 uses a cost function to minimize the error.

The training module 1520 may train the DNN for a predetermined number of epochs. The number of epochs is a hyperparameter that defines the number of times that the DL algorithm will work through the entire training dataset. One epoch means that each sample in the training dataset has had an opportunity to update internal parameters of the DNN. After the training module 1520 finishes the predetermined number of epochs, the training module 1520 may stop updating the parameters in the DNN. The DNN having the updated parameters is referred to as a trained DNN.

The validation module 1530 verifies accuracy of trained DNNs. In some embodiments, the validation module 1530 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 1530 determines may determine an accuracy score measuring the precision, recall, or a combination of precision and recall of the DNN. The validation module 1530 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 1530 may compare the accuracy score with a threshold score. In an example where the validation module 1530 determines that the accuracy score of the augmented model is lower than the threshold score, the validation module 1530 instructs the training module 1520 to re-train the DNN. In one embodiment, the training module 1520 may iteratively re-train the DNN until the occurrence of a stopping condition, such as the accuracy measurement indication that the DNN may be sufficiently accurate, or a number of training rounds having taken place.

The inference module 1540 applies the trained or validated DNN to perform tasks. For instance, the inference module 1540 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 1540 distributes the DNN to other systems, e.g., computing devices in communication with the DNN system 1500, for the other systems to apply the DNN to perform the tasks.

The memory 1550 stores data received, generated, used, or otherwise associated with the DNN system 1500. For example, the memory 1550 stores the datasets used by the training module 1520 and validation module 1530. The memory 1550 may also store data generated by the training module 1520 and validation module 1530, such as the hyperparameters for training DNNs, internal parameters of trained DNNs (e.g., values of tunable parameters of FALUs), etc. In the embodiment of FIG. 15, the memory 1550 is a component of the DNN system 1500. In other embodiments, the memory 1550 may be external to the DNN system 1500 and communicate with the DNN system 1500 through a network.

Example Computing System

Figure 16:
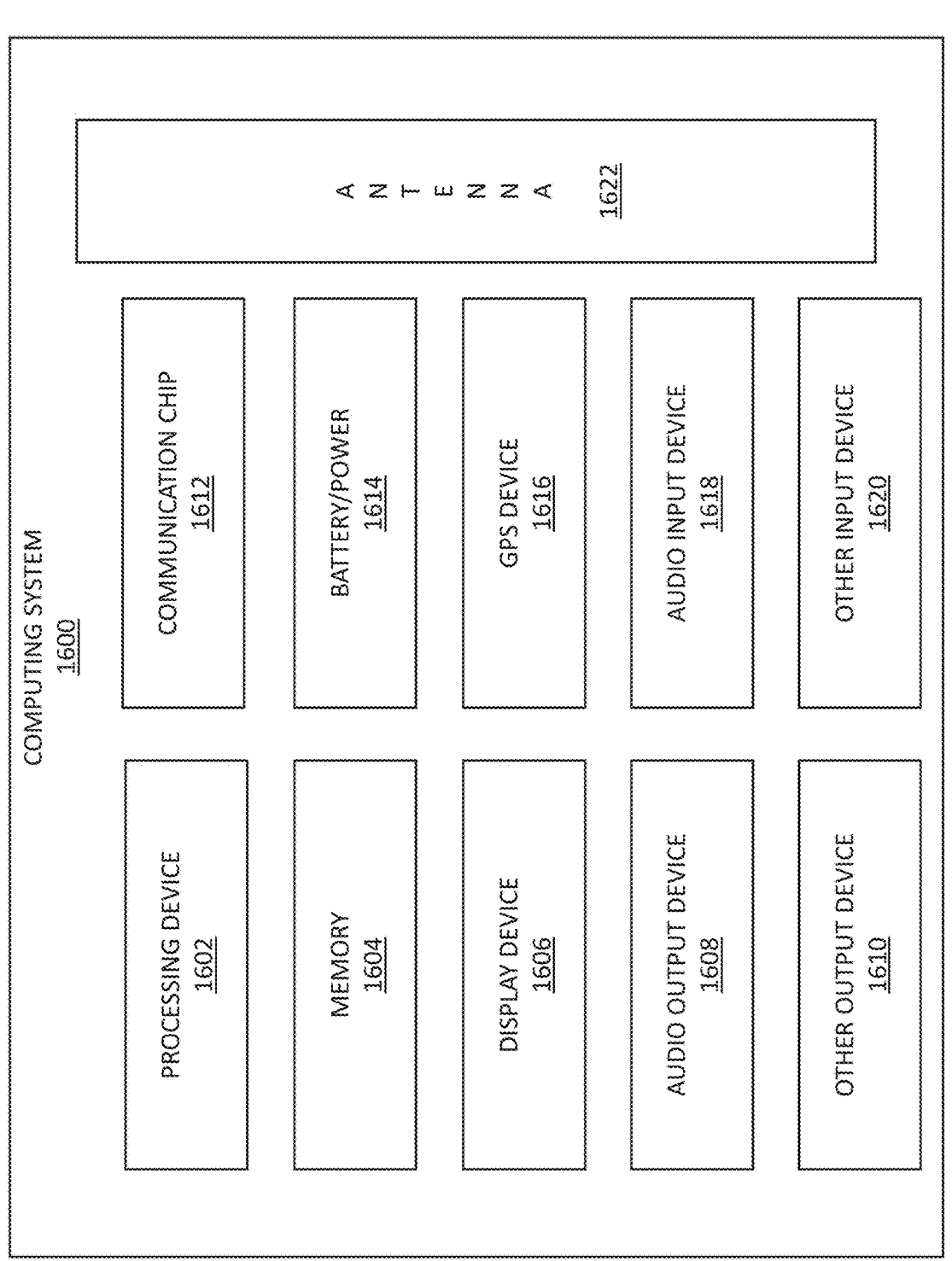
FIG. 16 is a block diagram of an example computing device, in accordance with various embodiments.

FIG. 16 is a block diagram of an example computing system 1600, in accordance with various embodiments. A number of components are illustrated in FIG. 16 as included in the computing system 1600, but any one or more of these components may be omitted or duplicated, as suitable for the application. In some embodiments, some or all of the components included in the computing system 1600 may be attached to one or more motherboards. In some embodiments, some or all of these components are fabricated onto a single system on a chip (SoC) die. Additionally, in various embodiments, the computing system 1600 may not include one or more of the components illustrated in FIG. 16, but the computing system 1600 may include interface circuitry for coupling to the one or more components. For example, the computing system 1600 may not include a display device 1606, but may include display device interface circuitry (e.g., a connector and driver circuitry) to which a display device 1606 may be coupled. In another set of examples, the computing system 1600 may not include an audio input device 1618 or an audio output device 1608, but may include audio input or output device interface circuitry (e.g., connectors and supporting circuitry) to which an audio input device 1618 or audio output device 1608 may be coupled.

The computing system 1600 may include a processing device 1602 (e.g., one or more processing devices). An embodiment of the processing device 1602 is a processing device 1602 in FIG. 1. The computing system 1600 may include a memory 1604, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1604 may include memory that shares a die with the processing device 1602. In some embodiments, the memory 1604 includes one or more non-transitory computer-readable media storing instructions executable to perform operations for accelerating sparse matrix computation in DL. The instructions stored in the one or more non-transitory computer-readable media may be executed by the processing device 1602.

In some embodiments, the computing system 1600 may include a communication chip 1612 (e.g., one or more communication chips). For example, the communication chip 1612 may be configured for managing wireless communications for the transfer of data to and from the computing system 1600. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1612 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1612 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1612 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1612 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1612 may operate in accordance with other wireless protocols in other embodiments. The computing system 1600 may include an antenna 1622 to facilitate wireless communications and/or to receive other wireless communications (such as AM or FM radio transmissions).

In some embodiments, the communication chip 1612 may manage wired communications, such as electrical, optical, or any other suitable communication protocols (e.g., the Ethernet). As noted above, the communication chip 1612 may include multiple communication chips. For instance, a first communication chip 1612 may be dedicated to shorter-range wireless communications such as Wi-Fi or Bluetooth, and a second communication chip 1612 may be dedicated to longer-range wireless communications such as global positioning system (GPS), EDGE, GPRS, CDMA, WiMAX, LTE, EV-DO, or others. In some embodiments, a first communication chip 1612 may be dedicated to wireless communications, and a second communication chip 1612 may be dedicated to wired communications.

The computing system 1600 may include battery/power circuitry 1614. The battery/power circuitry 1614 may include one or more energy storage devices (e.g., batteries or capacitors) and/or circuitry for coupling components of the computing system 1600 to an energy source separate from the computing system 1600 (e.g., AC line power).

The computing system 1600 may include a display device 1606 (or corresponding interface circuitry, as discussed above). The display device 1606 may include any visual indicators, such as a heads-up display, a computer monitor, a projector, a touchscreen display, a liquid crystal display (LCD), a light-emitting diode display, or a flat panel display, for example.

The computing system 1600 may include an audio output device 1608 (or corresponding interface circuitry, as discussed above). The audio output device 1608 may include any device that generates an audible indicator, such as speakers, headsets, or earbuds, for example.

The computing system 1600 may include an audio input device 1618 (or corresponding interface circuitry, as discussed above). The audio input device 1618 may include any device that generates a signal representative of a sound, such as microphones, microphone arrays, or digital instruments (e.g., instruments having a musical instrument digital interface (MIDI) output).

The computing system 1600 may include a GPS device 1616 (or corresponding interface circuitry, as discussed above). The GPS device 1616 may be in communication with a satellite-based system and may receive a location of the computing system 1600, as known in the art.

The computing system 1600 may include an other output device 1610 (or corresponding interface circuitry, as discussed above). Examples of the other output device 1610 may include an audio codec, a video codec, a printer, a wired or wireless transmitter for providing information to other devices, or an additional storage device.

The computing system 1600 may include an other input device 1620 (or corresponding interface circuitry, as discussed above). Examples of the other input device 1620 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (register fileID) reader.

The computing system 1600 may have any desired form factor, such as a handheld or mobile computing system (e.g., a cell phone, a smart phone, a mobile internet device, a music player, a tablet computer, a laptop computer, a net-book computer, an ultrabook computer, a PDA, an ultramobile personal computer, etc.), a desktop computing system, a server or other networked computing component, a printer, a scanner, a monitor, a set-top box, an entertainment control unit, a vehicle control unit, a digital camera, a digital video recorder, or a wearable computing system. In some embodiments, the computing system 1600 may be any other electronic device that processes data.

SELECT EXAMPLES

The following paragraphs provide various examples of the embodiments disclosed herein.

Example 1 provides an analog neural network, including a plurality of processing elements that is configured to: receive a first input including a first analog signal, and perform multiplication and accumulation operations on the first input to generate a first output, the first output including a second analog signal; and an analog circuit configured to: receive a second input including the second analog signal, and compute an activation function with the second analog signal to generate a second output, the second output including a third analog signal.

Example 2 provides the analog neural network of example 1, where the activation function is a hyperbolic tangent activation function, and the analog circuit is configured to compute the activation function with the second analog signal by converting values in the second analog signal into values in a predetermined range.

Example 3 provides the analog neural network of example 1, where the analog circuit includes a first transistor and a second transistor, and the first transistor and the second transistor are coupled to a current source.

Example 4 provides the analog neural network of example 3, where the first transistor is coupled to a first resistor, and the second transistor is coupled to a second resistor.

Example 5 provides the analog neural network of example 4, where a resistance of the first resistor is the same as a resistance of the second resistor.

Example 6 provides the analog neural network of example 3, where the first transistor is a first bipolar junction transistor including a first collector, a first emitter, and a first base, the second transistor is a second bipolar junction transistor including a second collector, a second emitter, and a second base, the first emitter and the second emitter are coupled to the current source, each of the first collector and the second collectors is coupled to a resistor, and the first base or the second base is configured to receive the second analog signal.

Example 7 provides the analog neural network of example 6, where the second input further includes a fourth analog signal, the first base is configured to receive the second analog signal, and the second base is configured to receive the fourth analog signal.

Example 8 provides the analog neural network of example 3, where the first transistor is a first metal-oxide-semiconductor field-effect transistor (MOSFET) transistor including a first source region, a first drain region, and a first gate, the second transistor is a second MOSFET transistor including a second source region a second drain region, and a second gate, the first source region and the second source region are coupled to the current source, each of the first drain region and the second drain region is coupled to a resistor, and the first gate or the second gate is configured to receive the second input.

Example 9 provides the analog neural network of example 9, where the second input further includes a fourth analog signal, the first gate is configured to receive the second analog signal, and the second gate is configured to receive the fourth analog signal.

Example 10 provides the analog neural network of example 3, where a size of the first transistor is the same as a size of the second transistor.

Example 11 provides the analog neural network of example 1, where the analog circuit includes a first group of transistors and a second group of transistors, the transistors in the first group are in parallel, the transistors in the second group are in parallel, and a centroid of the first group of transistors matches a centroid of the second group of transistors.

Example 12 provides the analog neural network of example 1, where the activation function is a rectified linear unit activation function, and the analog circuit is configured to apply the activation function on the second analog signal by converting one or more values in the second analog signal into a predetermined value and converting one or more other values in the second analog signal into zero.

Example 13 provides the analog neural network of example 1, where the analog circuit includes an analog comparator configured to receive the second analog signal and an analog multiplexer configured to output the third analog signal.

Example 14 provides the analog neural network of example 1, where the second output further includes a fourth analog signal the analog circuit includes an analog comparator, a first analog multiplexer, and a second analog multiplexer, the analog comparator configured to receive the second input, the first analog multiplexer is configured to output the third analog signal, and the second analog multiplexer is configured to output the fourth analog signal.

Example 15 provides the analog neural network of example 14, where the second input further includes a fifth analog signal, and the analog comparator is configured to receive the second analog signal and the fifth analog signal.

Example 16 provides the analog neural network of example 1, where the plurality of processing elements constitutes a layer of the analog neural network, further including an additional layer that is configured to: receive the third analog signal, and perform multiplication and accumulation operations on the third analog signal.

Example 17 provides the analog neural network of example 1, where a processing element is a memory device.

Example 18 provides the analog neural network of example 1, where the plurality of processing elements is arranged in columns and rows.

Example 19 provides a method for deep learning, the method including inputting a first analog signal into a first layer of an analog neural network, the first layer configured to perform multiplication and accumulation operations on the first analog signal and to generate a second analog signal; applying an activation function on the second analog signal by using an analog circuit, the analog circuit configured to output a third analog signal; and inputting the third analog signal into a second layer of the analog neural network.

Example 20 provides the method of example 19, where the analog circuit includes a group of transistors, and applying the activation function on the second analog signal by using the analog circuit includes inputting the second analog signal into a transistor in the group.

Example 21 provides the method of example 20, where the group of transistor includes a first subset of one or more transistors and a second subset of one or more transistors, and a centroid of the first subset matches a centroid of the second subset.

Example 22 provides the method of example 19, where the analog circuit includes an analog comparator and an analog multiplexer, and applying the activation function on the second analog signal by using the analog circuit includes inputting the second analog signal into the analog comparator.

Example 23 provides one or more non-transitory computer-readable media storing instructions executable to perform operations for deep learning, the operations including inputting a first analog signal into a first layer of a analog neural network, the first layer configured to perform multiplication operations and accumulation operations on the first input to generate a second analog signal; applying an activation function on the second analog signal by using an analog circuit, the analog circuit configured to output a third analog signal; and inputting the third analog signal into a second layer of the analog neural network.

Example 24 provides the one or more non-transitory computer-readable media of example 23, the analog circuit includes a group of transistors, and applying the activation function on the second analog signal by using the analog circuit includes inputting the second analog signal into a transistor in the group.

Example 25 provides the one or more non-transitory computer-readable media of example 23, where the analog circuit includes an analog comparator and an analog multiplexer, and applying the activation function on the second analog signal by using the analog circuit includes inputting the second analog signal into the analog comparator.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. An analog neural network, comprising:
a plurality of processing elements to:
receive a first input comprising a first analog signal, and
perform multiplication and accumulation operations on the first input to generate a first output, the first output comprising a second analog signal; and
an analog circuit comprising a first transistor and a second transistor, the analog circuit to:
receive a second input comprising the second analog signal, and
compute an activation function with the second analog signal to generate a second output, the second output comprising a third analog signal,
wherein:
the first transistor is a first bipolar junction transistor comprising a first collector, a first emitter, and a first base,
the second transistor is a second bipolar junction transistor comprising a second collector, a second emitter, and a second base,
the first emitter and the second emitter are coupled to a current source,
each of the first collector and the second collectors is coupled to a resistor, and
the first base or the second base is configured to receive the second analog signal.

2. The analog neural network of claim 1, wherein the activation function is a hyperbolic tangent activation function, and the analog circuit is configured to compute the activation function with the second analog signal by converting values in the second analog signal into values in a predetermined range.

3. The analog neural network of claim 1, wherein the first transistor is coupled to a first resistor, and the second transistor is coupled to a second resistor.

4. The analog neural network of claim 3, wherein a resistance of the first resistor is the same as a resistance of the second resistor.

5. The analog neural network of claim 1, wherein the second input further comprises a fourth analog signal in addition to the second analog signal, the fourth analog signal and the second analog signal are differential signals, the first base is configured to receive the second analog signal, and the second base is configured to receive the fourth analog signal.

6. The analog neural network of claim 1, wherein a size of the first transistor is the same as a size of the second transistor.

7. The analog neural network of claim 1, wherein:
the analog circuit comprises a first group of transistors and a second group of transistors,
the transistors in the first group are in parallel,
the transistors in the second group are in parallel, and
a centroid of the first group of transistors matches a centroid of the second group of transistors.

8. The analog neural network of claim 7, wherein the transistors in the first group and the transistors in the second group are all identical.

9. The analog neural network of claim 1, wherein the activation function is a rectified linear unit activation function, and the analog circuit is configured to apply the activation function on the second analog signal by converting one or more values in the second analog signal into a predetermined value and converting one or more other values in the second analog signal into zero.

10. The analog neural network of claim 1, wherein the analog circuit comprises an analog comparator configured to receive the second analog signal and an analog multiplexer configured to output the third analog signal.

11. The analog neural network of claim 1, wherein:
the second output further comprises a fourth analog signal in addition to the third analog signal,
the analog circuit comprises an analog comparator, a first analog multiplexer, and a second analog multiplexer,
the analog comparator configured to receive the second analog signal and the fourth analog signal,
the first analog multiplexer is configured to output the third analog signal, and
the second analog multiplexer is configured to output the fourth analog signal.

12. The analog neural network of claim 1, wherein the plurality of processing elements constitutes a layer of the analog neural network, wherein the analog neural network further comprises an additional layer that is configured to:
receive the third analog signal, and
perform multiplication and accumulation operations on the third analog signal.

13. The analog neural network of claim 1, wherein a processing element is a memory device.

14. The analog neural network of claim 1, wherein the plurality of processing elements is arranged in columns and rows.

15. One or more non-transitory computer-readable media storing instructions executable to perform operations for deep learning, the operations comprising:
inputting a first analog signal into a first layer of an analog neural network, the first layer configured to perform multiplication operations and accumulation operations on the first input to generate a second analog signal;
applying an activation function on the second analog signal by using an analog circuit, the analog circuit configured to output a third analog signal, the analog circuit comprising a group of transistors, the group of transistors comprising a first subset of one or more transistors and a second subset of one or more transistors, a centroid of the first subset matching a centroid of the second subset, wherein applying the activation function comprises inputting the second analog signal into a transistor in the group; and
inputting the third analog signal into a second layer of the analog neural network.

16. The one or more non-transitory computer-readable media of claim 15, wherein the analog circuit includes an analog comparator and an analog multiplexer, and applying the activation function on the second analog signal by using the analog circuit comprises inputting the second analog signal into the analog comparator.

17. An analog neural network, comprising:
a plurality of processing elements to:
receive a first input comprising a first analog signal, and
perform multiplication and accumulation operations on the first input to generate a first output, the first output comprising a second analog signal; and
an analog circuit comprising a first transistor and a second transistor, the analog circuit to:
receive a second input comprising the second analog signal, and
compute an activation function with the second analog signal to generate a second output, the second output comprising a third analog signal,
wherein:
the first transistor is a first metal-oxide-semiconductor field-effect transistor (MOSFET) transistor comprising a first source region, a first drain region, and a first gate,
the second transistor is a second MOSFET transistor comprising a second source region a second drain region, and a second gate,
the first source region and the second source region are coupled to a current source,
each of the first drain region and the second drain region is coupled to a resistor, and
the first gate or the second gate is configured to receive the second input.

18. The analog neural network of claim 17, wherein the second input further comprises a fourth analog signal in addition to the second analog signal, the fourth analog signal and the second analog signal are differential signals, the first gate is configured to receive the second analog signal, and the second gate is configured to receive the fourth analog signal.

19. The analog neural network of claim 17, wherein the activation function is a hyperbolic tangent activation function, wherein the analog circuit is configured to compute the activation function with the second analog signal by converting values in the second analog signal into values in a predetermined range.

20. The analog neural network of claim 17, wherein the first transistor is coupled to a first resistor and the second transistor is coupled to a second resistor, wherein a resistance of the first resistor is the same as a resistance of the second resistor.

21. The analog neural network of claim 17, wherein a size of the first transistor is the same as a size of the second transistor.

22. The analog neural network of claim 17, wherein the analog circuit further comprises:

an analog comparator to receive the second analog signal; and an analog multiplexer to output the third analog signal.

23. The analog neural network of claim 17, wherein:

the second output further comprises a fourth analog signal in addition to the third analog signal, the analog circuit comprises an analog comparator, a first analog multiplexer, and a second analog multiplexer, the analog comparator configured to receive the second input, the first analog multiplexer is configured to output the third analog signal, and the second analog multiplexer is configured to output the fourth analog signal.

24. The analog neural network of claim 17, wherein the plurality of processing elements constitutes a layer of the analog neural network, wherein the analog neural network further comprises an additional layer, the additional layer to receive the third analog signal and to perform multiplication and accumulation operations on the third analog signal.

25. The analog neural network of claim 17, wherein a processing element is a memory device.

* * * * *